US006966033B1

(12) United States Patent (10) Patent No.: US 6,966,033 B1
Gasser et al. (45) Date of Patent: Nov. 15, 2005

(54) METHODS AND APPARATUS FOR GRAPHICALLY MANAGING RESOURCES

(75) Inventors: Morrie Gasser, Hopkinton, MA (US); Hanna Yehuda, Newton, MA (US); Michael Patrick Bushe, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 635 days.

(21) Appl. No.: 09/966,529

(22) Filed: Sep. 28, 2001

(51) Int. Cl.[7] .............................................. G06F 15/00
(52) U.S. Cl. ..................................... 715/738; 715/771
(58) Field of Search ................................ 345/852, 792, 345/735, 738, 739, 734, 736, 771; 715/734–739, 715/964, 965, 966, 967, 969, 771–773; 718/104, 718/100; 709/223; 370/254

(56) References Cited

U.S. PATENT DOCUMENTS

| 4,772,882 | A   | * | 9/1988 | Mical .......................... 345/823 |
| 5,630,079 | A   | * | 5/1997 | McLaughlin ................ 715/734 |
| 5,714,971 | A   | * | 2/1998 | Shalit et al. ................. 345/804 |
| 6,404,743 | B1  | * | 6/2002 | Meandzija ................... 370/254 |
| 6,559,860 | B1  | * | 5/2003 | Hamilton et al. ........... 345/700 |
| 6,763,377 | B1  | * | 7/2004 | Belknap et al. ............. 709/223 |
| 6,848,102 | B2  | * | 1/2005 | Nakahara et al. ........... 718/104 |
| 6,848,104 | B1  | * | 1/2005 | Van Ee et al. .............. 719/310 |
| 2002/0133561 | A1 | * | 9/2002 | O'Brien et al. ............. 709/213 |

OTHER PUBLICATIONS

Morrie Gasser and Clifford E. Kahn; Methods and Apparatus for Representing Resources in a Computing System Environment; filed Sep. 28, 2001; Assigned to EMC Corporation.
Morrie Gasser; Methods and Apparatus for Presenting Information to a User of a Computer System ; U.S. Appl. No. 09/547,510; filed Apr. 12, 2000,; Assigned to EMC Corporation.

* cited by examiner

*Primary Examiner*—Steven P Sax
(74) *Attorney, Agent, or Firm*—Barry W. Chapin, Esq.; Chapin & Huang, LLC

(57) ABSTRACT

Mechanisms and techniques are disclosed that provide a graphical user interface and associated processing operations for performing management of resources in a network environment such as a storage area network. In one configuration, the system displays a plurality of resource tasks in a task display area on a graphical user interface and displays a plurality of resource objects in a resource display area on the graphical user interface. The system then receives a selection of one or more resource tasks identifying function(s) to apply to a selection of resource objects. The system then applies the function(s) associated with each selected resource task to the selection of resource objects to produce a set of resource information and displays the resource information for each resource object view panel(s) in an shared output display area for viewing by a user of the graphical user interface. This allows a user to apply multiple task functions to multiple selected resources and allows a user to display the results for all selected resource objects in a shared output display area.

37 Claims, 12 Drawing Sheets

METHODS AND APPARATUS FOR GRAPHICALLY MANAGING RESOURCES

RELATED APPLICATIONS INCORPORATED BY REFERENCE

The present invention relates to co-pending U.S. patent application Ser. No 09/966,475 entitled "METHODS AND APPARATUS FOR REPRESENTING RESOURCES IN A COMPUTING SYSTEM ENVIRONMENT", filed on the same day as the present Application. The present invention also relates to co-pending U.S. patent application Ser. No. 09/547,510 entitled "METHODS AND APPARATUS FOR PRESENTING INFORMATION TO A USER OF A COMPUTER SYSTEM", filed on Apr. 12, 2000. These related Patent Applications are assigned to the assignee of the present invention. The entire teachings and contents of these reference Patent Applications are hereby incorporated by reference in their entirety.

FIELD OF THE INVENTION

The present invention generally relates to computer and software systems that have a graphical user interface, and more particularly, to systems and techniques which allow for management of computer, network and storage system resources via a graphical user interface.

BACKGROUND OF THE INVENTION

Many types of computer systems can operate software programs that include a conventional graphical user interface (GUI) that allows a user of the computer system to manage, control and configure various types of hardware and software resources. The graphical user interface may allow, for example, a user of the computing system to interact with the computing system and its associated software applications, filesystem(s), data, devices and/or peripherals. Some conventional programs, generally called management applications, provide a graphical user interface that allows management and control over computer system and device resources via a visual representation of the resources on the graphical user interface. Resources that may be controlled or managed graphically in this manner can include local computer system resources, as well remote computer system or other device resources that can communicate with the management application via a communications network.

The graphical objects or representations within a graphical user interface are called "icons". A user of a graphical user interface can manipulate and select icons which represent the resources in order to control or manage the resources in some manner. For example, a graphical user interface may display a printer icon that represents a printer attached to either the local or to a remote computer system. A user of the graphical user interface can select the printer icon by using an input device such as a mouse. When the user clicks a button on the mouse while selecting the printer icon using the mouse pointer on the graphical user interface shown on the computer's display, the graphical user interface might, for example, produce a pull-down menu that lists printer management functions that can the user can select to operate the printer. An example of a management function is a function to take the printer online or offline, or for making the printer available for use by others (e.g., sharing the printer on a network).

The Windows series of operating systems (e.g., Windows 95, Windows 98, Windows NT, Windows 2000, collectively referred to herein as Windows), manufactured by Microsoft Corporation of Redmond Wash., U.S.A., provides various application programs that include one or more graphical user interfaces that operate in the manner discussed above. Windows 95, Windows 98, Windows NT and Windows 2000 are trademarks of Microsoft Corporation.

Generally, Windows provides access to a computing system via a graphical representation of the computing system called a desktop. The Windows desktop allows a user of the computer system to navigate and manage file systems contained within one or more storage devices (e.g., disks) associated with the computing system. Limited device management is also provided via the Windows desktop and associated Windows applications that provide graphical user interfaces for such management functions. One example of a software application included with Windows that provides such file system and device management capabilities via a graphical user interface is the Windows Explorer application program.

A user can use Windows Explorer to view and graphically navigate and manage certain resources associated with the computer system operating the Windows operating system. To do so, the left side of the graphical user interface within Windows Explorer provides a hierarchical and graphical representation of resources related to the computing system. For example, Windows Explorer can represent directories on disk(s) accessible to the computer system as a hierarchical arrangement of folder icons on the left side of the Windows Explorer graphical user interface. Each folder icon in the hierarchy represents a directory on the disk containing files and/or other folders (i.e., subdirectories). A user can click or double-click a folder icon in the hierarchy to open or close that folder. If the folder is already open, a user click causes the GUI to close that folder.

In response to a user clicking a folder icon to "open" that folder in the hierarchy, Windows Explorer redisplays the folder icon in the hierarchy on the left side of the GUI to appear as an "open" folder icon and modifies the hierarchy to include a display of any sub-folders icons that exist hierarchically below or "within" the open folder. In addition, on the right side of the Windows Explorer graphical user interface, Windows Explorer displays icons a list of any files or folders that exist within the selected folder in the hierarchy from the left side of the graphical user interface. If the user continues to navigate the file system by selecting folders in the left side hierarchy, each new selection of a folder causes Explorer to further open or "expand" any folders below the selected folder on the left side hierarchy of the graphical user interface, and replaces the list of files of folders on the right side of the graphical user interface with a list of the contents of the selected folder. In other words, each time a new folder is selected in the left side hierarchy, the graphical user interface expands (in the case of opening a closed folder) or collapses (in the case of closing an already open folder) the left side hierarchy with respect to that folder and replaces the right side list of the display with the contents of the selected folder.

Many graphical user interface based applications such as Windows Explorer allow a user to elect to arrange a list of icons that the graphical user interface displays according to certain pre-defined user selectable views. For example, the user may elect to have a graphical user interface based application display icons alphabetically, or by creation date, by size, by author, or by another display criteria. If a user elects to arrange a view of icons based on one of these attributes, Windows Explorer displays the sorted list of icons according to the user selected attribute (e.g., size, date, etc.) within the GUI display.

Graphical user interface based applications that provide users with the ability to manage computer system resources typically provide such functionality via a series of pull down menus having associated functions listed within the menus. For example, Windows Explorer provides pull-down menu choices such as "File" and "Edit." A user can select a folder or file as discussed above and can then pull down, for example, the Edit menu and select a copy function. Upon doing so, the Windows Explorer program makes a copy of the selected file. The user can then select this copy of the file and can drag-and-drop the copy, for example, to another folder that is visible on the graphical user interface display, causing the Windows Explorer program to move the copy of the file from the selected location to the destination folder where the user dragged the icon. Some applications provide graphical user interfaces which provide a row of icons for various functions. A user can select an icon for a function and the function will be carried out upon, or applied to, the particular resource that the user has selected. In the Macintosh computer system operating the MacOS operating system manufactured by Apple Computer, Inc. of Cupertino, Calif., U.S.A., users are allowed to select multiple items within a selection window and can apply a single function to the items which results in producing a separate respective window for each item selected to show or convey the results of applying that function to the item associated with that window.

SUMMARY OF THE INVENTION

Conventional software applications and computer systems that provide graphical user interfaces for management of computer system resources are somewhat limited in their functionality. Such limitations are due in part to operational limitations of the conventional graphical user interfaces provided by those applications.

For example, the graphical user interface provided by Windows Explorer is limited to allowing the user to select a single icon from the set of icons that are arranged in a hierarchical format. As a result of this limitation, the right side of the Windows Explorer graphical user interface can only display a list of items related to the single selected item with the hierarchical list. The graphical user interface does not allow a user, for example, to concurrently select multiple computer system resources, such as multiple folders, from within the hierarchy of folders, and then to concurrently display the contents of each folder selected within the set of multiple selected folders. As a result, it is difficult, for example, to compare and contrast the contents of two system resources, such as to compare the contents of two folders to determine what files exist in one folder as opposed to the files that exist within another folder. In order to do so, the user must create another window in which to execute another instance of Explorer for the other (i.e., a second) system resource in order to have the contents of each resource displayed on the screen at the same time.

Stated in more general terms, conventional graphical user interfaces that provide system management functionality do not generally allow a user to concurrently select multiple computer systems resources and to concurrently display resource information concerning each selected resource, some of which may be different types of resources from other selected resources, at the same time in the same window on the screen. By window, what is meant is a common graphical area such as a single container, frame, tile or window in a window-based operating system. Instead, conventional systems require the creation of separate output display areas such as separate windows for the output of different resource information for different selected resources. In addition, conventional graphical user interfaces provided within software applications that manage computer system resources generally allow a user to invoke a single function at a time upon a single selected resource and only allow a user to view resulting resource information (i.e., the output of the function) for the single selected resource in a single window whereas output for other selected resources must be displayed in separate windows. As an example, the MacOS operating system creates different windows for each selected resource to which a function is applied. In this manner, different resource outputs are displayed in different windows that may overlap each other, thus preventing the user from being able to view all output for all selected resources in a coherent manner. MacOS does not allow a user to apply a function to multiple resources which may be of different types and have the resulting output produced for the different types of resources shown in a single window.

Conventional resource management applications generally do not allow configuration functions such as systems management operations to be applied to multiple system resources (e.g., to reset or group of devices, some of which may be different from each other) with the results displayed in a common or shared output display area. This can become a problem when a user desires to view the systems management output information for each resource at the same time. Since conventional systems provide such output in separate display areas (e.g., separate windows), management of resources quickly becomes cumbersome and inefficient due to the graphical user interface becoming crowded. Conventional graphical user interfaces used for systems or network management operations thus do not allow, for example, a user to simultaneously select multiple management functions and have those functions concurrently applied to multiple managed resources while keeping the output in a single shared output display area such as a single window, tile, frame, or the like. Instead, in conventional systems, each resource (e.g., each device) must be configured using a separate configuration operation or function from the other devices which produces a separate result in a separate output display area. This allows for errors to be introduced into system or device configurations and especially in the case where multiple devices must be configured alike since comparison of output information becomes more error prone when the output is scattered in different areas. This allows a user that configures multiple devices independently to accidentally configure one device differently from the others.

In addition to the aforementioned limitations of conventional graphical user interfaces used to perform systems, network and device management functions, such graphical user interfaces do not allow a user to view the results of former configuration operations (i.e., the results of performing a first set of management operation on a first set of devices) while performing a new set of management operations on the same, or on a new set of devices or resources, and then to concurrently view the results of each set of management operations at the same time in a shared output display area. This is problematic since management of devices in a network such as a storage area network can involve quite complex management operations. The results of such management operations might be useful for performing the next set of management operations. Since conventional graphical user interfaces do not provide an easy way to continually view the results of all management operations in a single area while continuing to carry out new management operations, a network manager responsible for managing a set of resources can quickly become confused as to former management operations that were carried out, but for which the results of such operations are no longer easily visually available for reference while concurrently carrying out additional management operations.

Embodiments of the present invention provide a unique graphical user interface that significantly overcomes many of the problems of conventional graphical user interfaces used for management of resources in a computer system or networked computing or storage environment. Embodiments of the invention are directed to graphical user interfaces and the programs, routines, applets, procedures, functions and/or processes that provide such interfaces as described herein. Preferred embodiments of the invention operate within the management station computer system such as a storage area network management station and provide for the management of storage area network resources. Such a computer system can operate, for example, a resource management application that provides the graphical user interface as explained herein.

In brief, the resource management application that provides a graphical user interface configured according to embodiments of this invention allows a user to select one or more resource tasks that can be applied to multiple selected resource objects. The resource tasks may be icons that represent various systems management operations or groupings of such operations. The resource management application applies a function(s) associated with each selected resource task to resource data associated a selection of resource objects to produce resource information that the resource management application can display in one or more view panels on or in a shared output display area of the graphical user interface, such as within a single window, tile, frame or other structure for concurrent viewing by the user. The selection of resource objects represent manageable objects such as devices, computer or data storage systems, software entities or other resources that operate, for example, in a storage area network environment. By concurrently allowing a user to view the output of one or more selected resource tasks as applied to multiple selected resource objects in the same screen area (i.e., same window, tile, etc.), embodiments of the invention allow a user to efficiently and remotely manage, configure, discover and otherwise manipulate managed resource objects such as network devices, software applications, storage systems or devices therein or other entities under management control of the resource management application.

In addition, embodiments of the invention further allow a user to select, for example, a particular view panel produced as a result of the aforementioned management operations. The view panel can contain resource information produced as a result of applying the selected task function(s) to multiple selected resource objects that may be of different types. By selecting one or more view panels to be a target panel(s), and then by further modifying the selection of resource tasks (e.g., selecting a different systems management operation) or resource objects (e.g., on the same or on different managed objects), the resource management application of the invention can apply the modification of the selection of resource tasks or resource objects to produce additional resource information which is then output to the target panel(s), while concurrently maintaining the formerly displayed view panels that are not target panels in an undisturbed manner within the shared output display area of the graphical user interface.

This allows, for example, a user to invoke resource tasks on a first set of managed resource objects and have a result of those operations displayed in a view panel in the shared output display area. Then, via selection of one of the view panels to be a target panel (i.e., a current target panel), a user can perform additional management operations via another selection of resource tasks and/or resource objects which produces resource information that is output to the target panel while still also displaying the view panels (i.e., the undisturbed panels) from the first (i.e., a former) management operation (i.e., formerly selected and applied resource task). This provides a graphical systems management environment that is less prone to errors and that further allows a user to consistently configure numerous devices or entities represented by resource objects in a consistent manner.

In particular, the system of the invention provides method embodiments which operate in a computer system having a memory system and a display that displays a graphical user interface for management of network or storage resources. Such a method embodiment comprises the steps of displaying a set of resource tasks in a task display area and concurrently displaying a set of resource objects in a resource display area. The resource tasks can represent, for example, system management or storage management operations or functions that a systems or network manager can perform on various resources represented by the resource objects. Such tasks may be available as selectable icons on the graphical user interface, or, alternatively, may be available in pull down menus or in another manner. The resource objects can represent manageable resources such as data storage systems or portions thereof (e.g., volumes, partitions, individual disks, controllers, tapes, caches, interfaces, and so forth), storage area network resources, network switches, host computer systems (e.g., servers), client computer systems, as well as devices or programs operating within any of these systems (e.g., interface boards, processors, or other hardware devices) that can be remotely managed, as well as software applications and processes that can be remotely managed.

The method embodiment also includes the steps of receiving a selection of at least two resource objects displayed within the resource display area upon which to apply a function associated with at least one resource task displayed in the task display area. A user may make such a resource object selection by explicitly selecting the resource itself (e.g., an icon representing the resource), or, for example by selecting a check box associated with the resource. The method applies the function(s) associated with at least one resource task to resource data associated with each selected resource object to produce resource information for each selected resource object and concurrently displays the resource information for each selected resource object in at least one shared output display area such that a user of the computer system can simultaneously view the resource information for each selected resource object on the graphical user interface. A shared output display area in this example embodiment is a single window or a tile in a window, for example, in which resource information may be viewed for multiple resources of the same or of a different type. Since the output display area is "shared", multiple types of resource information that is output can be shown (i.e., displayed) in this shared area, without requiring the user to view or look at multiple output display areas for the different pieces of resource information produced from the selected resource task(s).

In another embodiment of the invention, in the step of applying, the function applied to resource data associated with each selected resource object is obtained by receiving a selection of at least one resource task. The resource task has an associated function which the step of applying applies to one or more of the selected resource object(s) to produce resource information as a result of the function in the shared output display area. In this manner, a user such as a network or storage administrator or manager can graphically select a resource task (or multiple tasks) and can apply this task, such as a systems or storage management operation, to multiple selected resource objects so that the task is carried out in a consistent manner in each device, system or other entity represented by the selected resource objects, and that the output produced from the operation is displayed in one shared output display area, such as a single tile or window, no matter what types of resource output information are produced.

In yet another embodiment of the invention, the step of applying the function comprises the steps of determining, for each selected resource task, any use cases associated with that task that apply to any selected resource objects and, for each use case that applies to a selected resource object, applying an associated function of that use case to resource data associated with the selected resource object to which that use case applies in order to produce the resource information for that selected resource object.

Using this technique, if a user selects a resource task and that task applies to some selected resource objects but not to others (as determined by an existing use case, to be explained), the resource information is generated by applying the function associated with that task to those resource objects to which that task is appropriately applied. In other words, the function is only applied to resources that are relevant to that function, as determined by a use case related to that resource (or to that function).

In another embodiment of the invention, the resource objects represent entities within a storage area network and the resource tasks represent systems management functions that can be carried out upon the entities with the storage area network. In this embodiment, the graphical user interface operates as a control center for management of storage area network resources and allows configuration and management of high capacity data storage systems.

In still another embodiment, the step of receiving a selection of at least one resource task comprises receiving a selection of at least two different resource tasks, each having at least one respective associated function. In this manner, a user can select multiple resource tasks to be applied to multiple selected resource objects. Also in this embodiment, the step of applying applies each respective associated function of each of the selected resource tasks to data associated with at least one of each selected resource object to produce resource information for each respective associated function for the resource objects to which that function is applied. Also in this embodiment, the step of concurrently displaying the resource information for each selected resource object concurrently displays resource information for each respective associated function for the resource objects to which that function is applied in respective shared output display areas, such that a user of the computer system can concurrently compare resource information produced from applying multiple functions associated with multiple resource tasks on multiple resource objects.

In a further embodiment, the step of displaying a set of resource tasks in a task display area includes the steps of displaying a plurality of task categories, each task category identifying a set of related resource tasks based upon a commonality between functions associated with each resource task in the set. The method embodiment then performs the steps of receiving a selection of at least one task category from the plurality of task categories and in response to receiving the selection of at least one task category, displaying the set of related resource tasks identified by the selection of at least one task category while hiding from display other sets of resource tasks identified by task categories that are not selected. In this manner, a graphical user interface produced according to embodiments of the invention can provide task categories of resource tasks group according to functions for ease of selection of resource tasks.

In another embodiment, the displayed set of related resource tasks identified by the selection of at least one task category includes at least one resource view task which a user of the computer system may select such that the step of applying the function associated with at least one resource task applies a view function associated with the resource view task to produce resource information in a view format allowing the user to graphically view the resource information. This embodiment thus allows a user to graphically view, for example, network management information produced as a result of applying the selected resource task to selected resource objects. The view format may include, for example, a network graph, tree, topology map, or other graphical display of network management information.

In yet another embodiment of the invention, the step of concurrently displaying a set of resource objects hierarchically displays the set of resource objects in a resource display area according to a resource object hierarchy that defines hierarchical relationships between certain of the resource objects, such that resource objects hierarchically related below other resource objects are hierarchically displayed below the other resource objects. Also in this embodiment, the step of receiving a selection of at least two resource objects comprises the steps of receiving a selection of a first resource object within the hierarchical display of resource objects and, while maintaining the selection of the first resource object, receiving a selection of a second resource object within the hierarchical display of resource objects. This embodiment thus allows a user to select multiple resource objects which may be the same or which may be of different types. The hierarchical display may be the same hierarchical display, or may be another hierarchical display in another view panel. One or more functions associated with the selected resource tasks can be applied to each selected resource object even if the selected resource objects are of different types and even if multiple tasks are selected of different types.

In another embodiment, the resource tasks are displayed on a left portion of the graphical user interface, the resource objects are displayed in a center portion of the graphical user interface, and the shared output display area displays the resource information in at least one view panel with the shared output display area on a right portion of the graphical user interface. This provides an intuitive interface for a user to perform system management operations on resources using the graphical user interface of the invention.

Any further embodiment, at least one of the resource display area and the shared output display area include a view panel that includes at least one split panel function. Its folktale function is any type of function that a user to invoke to graphically divide the view panel into multiple view panel areas. This embodiment also performs the steps of receiving a selection of a split panel function for a view panel on the graphical user interface dividing the view panel into at least two view panels in response to receiving the selection of the split panel function.

In another embodiment, the split panel function is at least one of a horizontal split panel function and a vertical split panel function. The horizontal split panel function allows the user to split a view panel horizontally whereas the vertical split panel function allows the user to split a view panel vertically into multiple view panels.

In still another embodiment, the view panel, for which the selection of the split panel function is received, is a resource object view panel in the resource display area that contains a display of resource objects for selection by a user, and the step of dividing creates two resource object view panels from which a user of the graphical user interface can select resource objects for application of functions associated with selected resource tasks. In this embodiment then, the user may select the split function in order to split the resource display area into multiple view panels which, for example, may be scrollable in order to select a diverse array of resource objects upon which resource tasks are to be applied.

In another embodiment, the view panel for which the selection of the split panel function is received is a view panel in the shared output display area that contains a display of resource information, and the step of dividing creates two view panels from which a user of the graphical user interface can select one view panel to be a target view panel for display of resource information produced as a result of application of functions associated with selected resource tasks on selected resource objects. In this manner, a user can perform a resource task on a group of selected resource objects which results in one or more view panels produced in the shared output display area. Then, one of such view panels can be selected as a target panel and thereafter, other resource task functions can be applied to the same, or to different resource object selections, and the resource information produced as a result of such operations is presented within the target panel while concurrently leaving the formerly displayed view panels intact within the shared output display area.

In a further embodiment of the invention, the method includes the steps of receiving a selection of a view panel to operate as a target panel in the shared output display area on the graphical user interface and receiving a modification to a selection of either two resource objects displayed within the resource display area or a resource task displayed within the task display area. The method then applies the modification to the selection to produce resource information that is displayed within the target panel in the shared output display area. View panels in the shared output display area or elsewhere on the graphical user interface that are not target panels remain unaffected by such operations.

In another embodiment, the step of concurrently displaying displays the resource information in a form including at least one of: text, a table, a graph, and/or a network topology map. As such, the graphical user interface of the invention is not limited by the context of the resource information that is produced as a result of applying resource tasks to resource objects. Thus, some view panels may contain a graphical representation of the resource information data such as a network map or topology or hierarchical data structure while other view panels might contain, for example, text data in tabular form.

Other embodiment of the invention are directed towards a method of presenting systems management information relating to resources in a network. One such method embodiment comprises the steps of displaying a plurality of resource tasks in a task display area on a graphical user interface and displaying a plurality of resource objects in a resource display area on the graphical user interface. The method then receives a selection of at least one resource task identifying a function to apply to a selection of at least two resource objects and applies the function(s) associated with each resource task(s) to the selection of at least two resource objects to produce a first set of resource information. The method then displays the first set of resource information for each resource object in at least one view panel in an shared output display area for viewing by a user of the graphical user interface.

In another embodiment, the method also performs the steps of receiving a selection of at least one view panel in the shared output display area to be a target panel and receiving a modification to the selection of the resource task identifying a function to apply to the selection of resource objects. The method then applies the modification to any selected resource objects to produce a second set of resource information and then concurrently displays the second set of resource information in the target panel for viewing by a user of the graphical user interface while concurrently displaying at least portion of the first set of resource information in a view panel that is not the target panel.

Other embodiments of the invention include a computerized device, such as a host computer system, workstation or other computer system configured to process all of the aforementioned method operations disclosed herein as embodiments of the invention. In such embodiments, the computer system includes a display, a memory system, a processor and an interconnection mechanism connecting the display, the processor and the memory system. In such embodiments, the memory system is encoded with a resource management application that when performed on the processor, produces a resource management process that includes a graphical user interface produced on the display of the computer system. The graphical user interface allows the resource management process to perform all of the method embodiments and operations explained herein as embodiment of the invention.

Other arrangements of embodiments of the invention that are disclosed herein include software programs to perform the method embodiment step and operations summarized above and disclosed in detail below. More particularly, a computer program product is disclosed which has a computer-readable medium including computer program logic encoded thereon to provide a graphical user interface as explained herein. The computer program logic, when executed on at least one processor with a computing system, causes the processor to perform the operations (e.g., the methods) indicated herein as embodiments of the invention. Such arrangements of the invention are typically provided as software, code and/or other data arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computer system to cause the computer system to perform the techniques explained herein as embodiments of the invention.

It is to be understood that the system of the invention can be embodied strictly as a software program, as software and hardware, or as hardware alone. Example embodiments of the invention may be implemented within the EMC Control Center (ECC) software application that provides graphical management functionality of storage area network resources and in computer systems which operate the ECC software. ECC is manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
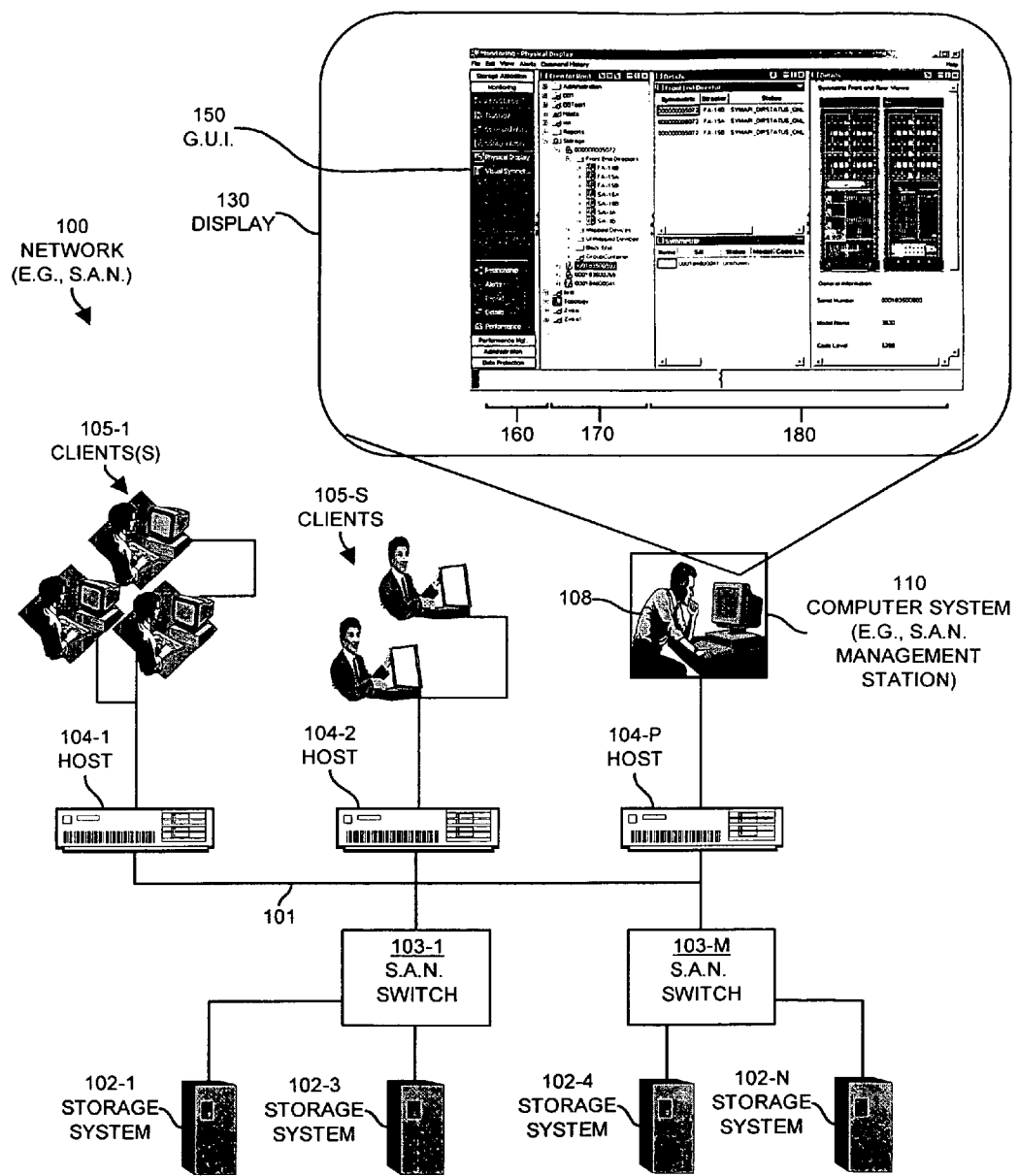
FIG. 1 illustrates an example storage area network and computing system environment including a management station computer system configured to operate according to embodiments of the invention.

Embodiments of the present invention relate to mechanisms and techniques that provide a unique graphical user interface for the management of storage system resources, network resources, and/or other computer-related system or device resources that can be managed via software or remote control. Preferably, the mechanisms and techniques that provide the graphical user interface as described herein include resource management software applications and/or management computer systems configured (e.g., programmed) to manage such resources. An example of a preferred embodiment is a computer system such as a workstation that operates as a storage area network management station for management of software, computer, storage and/or other device resources within a storage area network environment.

Resources that can be graphically managed by such an embodiment include both software resources such as application programs that operate on remote computerized devices (e.g., within data storage systems, for example), as well as the remote devices, servers, host, and client computer systems, storage systems, network switches or other entities upon, or in which those software applications operate. In an environment such as a storage area network, such resources (software and hardware) are often quite complex and can be configured in a variety of arrangements. A user of the system of the invention, such as a systems or network manager or administrator, can use the graphical user interface as provided by embodiments of the invention to efficiently manage (e.g., monitor, configure and/or otherwise operate) such resources in this type of environment.

More specifically, embodiments of the invention provide a graphical user interface as explained herein that allows a user, for example, to concurrently select one or more resource tasks which that user desires to have the management application perform upon multiple concurrently selected resource objects. The resource tasks graphically represent (e.g., via resource task icons on the graphical user interface) various management functions that the management application can apply or invoke upon resource objects which represent (e.g., graphically via icons) resources within the environment that can be managed by the management application. The management application can then apply functions associated with the selected resource tasks to the selected resource objects to produce resource information in the shared output display area of the graphical user interface that is concurrently displayed for each selected resource object. In this manner, embodiments of the invention allow a user to apply one or more management functions to multiple resource objects and allow the user to view the effects of the applied resource task(s) as they relate to each resource object at the same time. This allows, for example, a user to concurrently compare and contrast, without further manipulation of the graphical user interface, all resource information that is output as a result of the operation of the resource tasks on multiple selected resource objects.

FIG. 1 illustrates an example of a storage area network environment 100 that is suitable for use in explaining the operation of example embodiments of the invention. The storage area network 100 includes a network medium 101 such as a high-speed data communications medium (e.g., Ethernet, optical network, or other type of network) which interconnects a plurality of resources 102 through 110 and allows the resources to communicate with each other. The resources include a variety of data storage systems 102-1 through 102-N, storage area network switches 103-1 through 103-M, host computer systems 104-1 through 104-P, client computer systems 105-1 through 105-S, and a computer system 110 configured, in this example, as a storage area network management station that is operated by a network manager 108 (i.e., a person responsible for managing the resources within the storage area network 100). While not shown in detail in this figure, certain of the resources may include one or more internal devices as well as software applications or processes which operate within or in conjunction with the illustrated resources. As shown towards the top of FIG. 1, and of particular interest to this discussion, the management station computer system 110 includes a display 130 (e.g., provided by a monitor or other display device) upon which embodiments of the invention provide a graphical user interface 150 configured to operate as explained herein. The graphical user interface 150 of embodiments of the invention includes a task display area 160, a resource display area 170 and an shared output display area 180.

Generally, and as will be explained in more detail shortly, the graphical user interface 150 allows a user 108 of the computer system 110 to select one or more tasks (e.g., icons representing system management functions, not shown in this figure) from the task display area 160 which the systems management application operating in the computer system 110 can apply to multiple resource objects (i.e., icons representing resources within the network 100, not shown in this figure) that the user selects within the resource display area 170 to produce resultant resource information, can concurrently and simultaneously view resource information (i.e., text, data, graphs, maps, or other information) produced as output as a result of applying the function(s) associated with the selected resource task(s) to the selected resource object(s).

Figure 2:
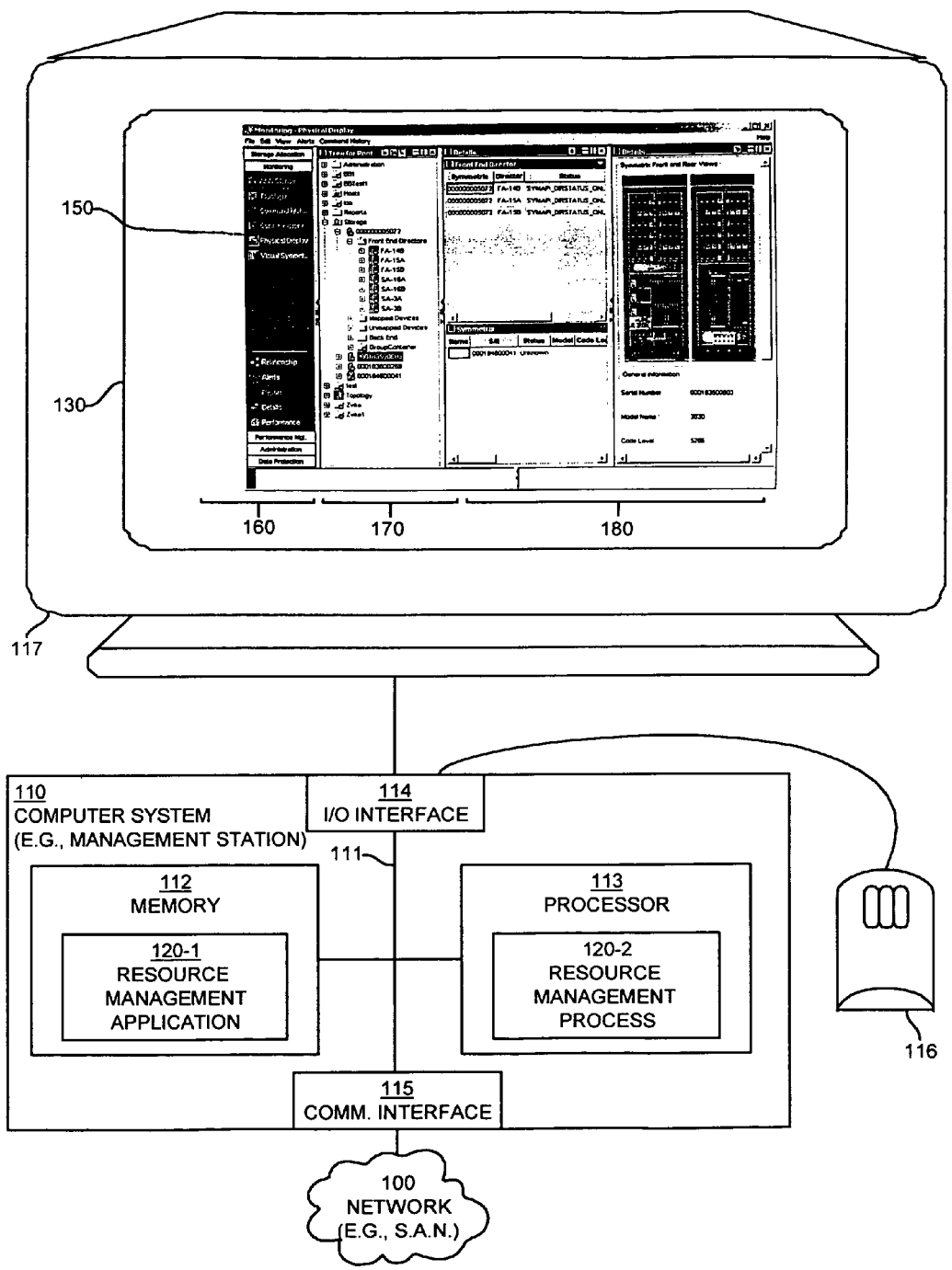
FIG. 2 illustrates an architecture of the management station computer system from FIG. 1 including an example of a graphical user interface configured according to embodiments of the invention.

FIG. 2 illustrates an example architecture of the computer system 110, such as a storage area network management station, configured according to embodiments of the invention. The computer system 110 may be any type of computerized device such as a personal computer, workstation, portable computing device or the like. The computer system 110 includes an interconnection mechanism 111 which couples a memory system 112, a processor 113, an input/output interface 114 and a communications interface 115. The input/output interface 114 allows peripheral devices to be connected to the computer system 110. In this example, coupled to the input output interface 114 and operating as part of the computer system 110, are a peripheral input device 116 such as a mouse or keyboard and a peripheral output device 117 such as a computer monitor or screen which includes a display 130 upon which the computer system 110 can render or otherwise display visual images such as the GUI 150 for viewing by the user 108. The communications interface 115 allows the computer system 110 to communicate with devices (i.e., resources) that operate within the network 100.

The memory system 112 is encoded with a resource management application 120-1. The resource management application 120-1 represents software code such as data and/or logic instructions (e.g., stored in the memory or on another computer readable medium such as a disk) that embody the processing functionality of embodiments of the invention. The processor 113 can access the memory system 112 via the interconnection mechanism 111 in order to launch, run, execute, interpret or otherwise perform the logic instructions of the resource management application 120-1 in order to produce the resource management process 120-2. In other words, the resource management process 120-2 represents one or more portions of the resource management application 120-1 (or the entire application 120-1) performing within or upon the processor 113 in the computer system 110.

Is to be understood that embodiments of the invention include the resource management application 120-1 (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments of the invention comprise the resource management application 120-1 operating within the processor 113 as the resource management process 120-2. While not shown in this example, those skilled in the art will understand that the computer system 110 may include other processes and/or software and hardware components, such as an operating system, which have been left out of this illustration for ease of description of the invention.

Directing attention now to the graphical user interface 150, when the resource management process 120-2 operates within the computer system 110, the user 108 (FIG. 1) can use the input device 116 to control an input selector such as a mouse pointer to perform resource task selections within the task display area 160. Before or after resource task selections, the user can use the input device 116 to select two or more (i.e., a plurality) resource objects that the resource management process 120-2 displays within the resource display area 170. Each resource object represents a manageable device, system, software application, interface, device driver, or other entity that exist and operates within the network 100. When the user uses the input device 116 to perform a combination of selecting one or more resource tasks and multiple resource objects, the resource management process 120 applies a function associated with each selected resource task to each selected resource object to produce resource information(i.e., output of a task function applied to resource object data) within the shared output display area 180. The user 108 can then view the graphical user interface 150 on the display 130 in order to determine the results of the management operation(s) or function(s) performed by the selected resource task(s) on the selected resource objects.

Figure 3:
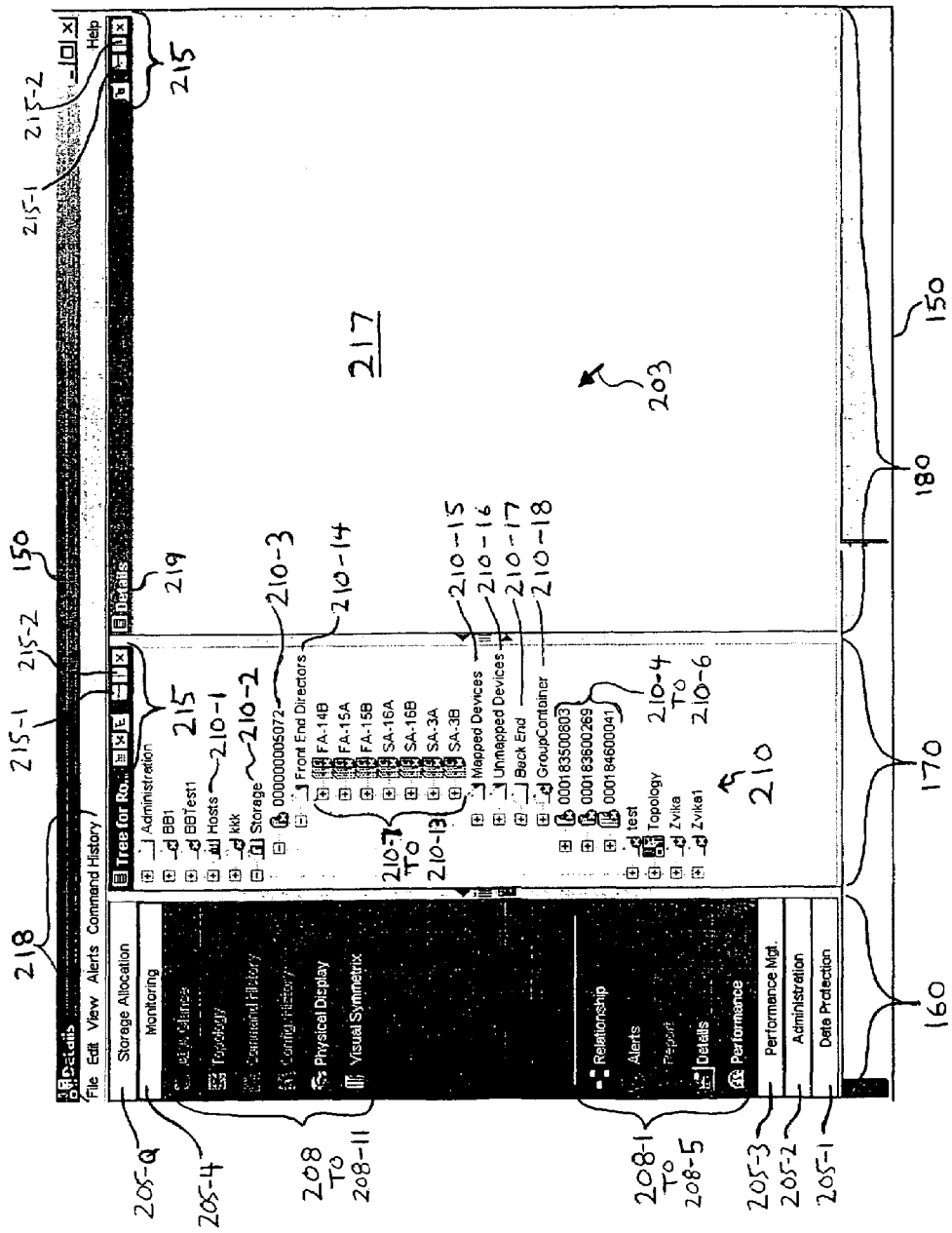
FIG. 3 shows an example of a graphical user interface configured according to embodiments of the invention.

FIG. 3 illustrates a more detailed example of the contents of the graphical user interface 150 provided by embodiments of the invention. The illustration in FIG. 3 is an actual screen shot of a storage area network management application 120-1 (i.e., an embodiment of the resource management application 120-1) that provides the graphical user interface 150 and which is configured according to embodiments of the invention. The application 120-1 providing the graphical user interface 150 can allow a user 108 to remotely manage storage area network resources including software and hardware operating within the data storage systems 102, the storage area network switches 103, the hosts 104 and the clients 105.

It is to be understood that the graphical user interface 150 illustrated in FIG. 3 is shown by way of example only. Embodiments of the invention as explained herein can also be implemented within other graphical user interfaces as well. Examples of other such interfaces will be discussed in detail later with respect to FIGS. 12 and 13.

In the example graphical user interface 150 in FIG. 3, the task display area 160 includes a plurality of selectable task categories 205-1 through 205-Q. The user 108 operating the graphical user interface 150 can use the input selector 203 (e.g., a mouse pointer) to select a particular task category 205 which causes the resource management process 120-2 to display the available resource tasks 208 that are associated with the particular selected task category 205. In this example, the task categories 205 include data protection 205-1, administration 205-2, performance management 205-3, monitoring 205-4 and storage location 205-Q. It is to be understood that embodiments of the invention are not limited to displaying only the task categories 205 shown in this example.

In the instant example, the user 108 happens to select the monitoring task category 205-4 and as a result, the resource management process 120-2 displays the available monitoring resource tasks 208-1 through 208-11 that are associated with the monitoring task category 205-4. The monitoring resource tasks 208-1 through 208-11 in this example include performance 208-1, details 208-2, report 208-3, alerts 208-4, relationship 208-5, at-a-glance 208-6, topology 208-7, command history 208-8, configuration history 208-9, physical display 208-10 and Visual Symmetrix 208-11. Each of these resource tasks 208 represents one or more systems management functions or operations that the resource management process 220-2 can apply to any resource objects 210 that the user 108 happens to select within the resource display area 170.

In this example embodiment, the task display area 160 operates as follows: If the user 108 uses the input selector 203 to select another task category 205, such as the "Administration" task category 205-2, the resource management process 120-2 moves the headings or titles of the administration task category 205-2, as well as any other task categories 205 listed above the administration task category 205-2, to the top of the task display area 160 and further displays any associated administration resource tasks 208 that the resource management application 120 might provide below the administration task category heading or title 205-2. In this manner, the user 108 chooses an individual task category 205 from an organized list of task categories 205-1 through 205-Q and in response, the resource management process 120-2 displays any resource tasks 208 associated with the selected task category 205 while hiding other resource tasks 208 associated with other task categories 205 that were not selected. The user 108 may select resource task 208 before or after selection of a resource object 210. Also shown in this example graphical user interface 150 are a set of task menus 218 which a user 108 can pull-down to expose menus (not shown in this example) on the graphical user interface containing selectable resource tasks.

The resource management process 120-2 displays numerous resource objects 210 within the resource display area 170. In this example, the resource objects 210 are arranged in a hierarchical manner. Each resource object 210 represents one or more (i.e. a group) of managed objects that correspond to one or more manageable network resources within the network 100. In other words, some resource objects 210 represent individual manageable objects or entities such as individual devices, specific software applications, specific storage systems or internal devices or portions thereof operating within the network 100, while other resource objects 210 represent groups of related managed objects, program, devices or other such entities.

The resource display area 170 in this example operates as follows: A user 108 operating the graphical user interface 150 can use the input selector 203 to expand (i.e., open) or collapse (i.e., close) certain resource objects 208 by selecting the respective plus "+" or minus "−" signed immediately to the left of the resource objects 210. Expanding or opening a resource object 210 (by selecting the plus sign) causes the resource management process 120-2 to display any resource objects 210 that are hierarchically related below the selected or opened resource object 210. Collapsing or closing a resource object 210 (i.e., by selecting the minus sign) causes the resource management process 120-2 to condensed the resource objects 210 that are hierarchically display below the selected resource object 210.

This operation is illustrated in FIG. 3 by the "storage resource" object 210-2 which the user has previously selected for expansion and which caused the resource management process 120-2 to display other resource objects 210-3 through 210-18 hierarchically related below the storage resource object 210-2. The storage resource object 210-2 represents a group of manageable data storage systems 102, each represented by the storage system resource objects 210-3 through 210-6. Also in this example, the user 108 previously selected the data storage system resource object 210-3 for further expansion in the hierarchy. The data storage system resource object 210-3 represents a particular data storage system 102 operating within the network 100.

The label, name or title given to the particular resource object 210 is representative of the resource object and in this case, represents the serial number of a particular data storage system 102. Upon expansion of the data storage system resource object 210-3, the resource management process 120-2 displays the resource objects 210-14 through 210-18 which each represent resource objects such as software, devices or groups thereof that operate within the particular data storage system 102 represented by the data storage system resource object 210-3. In other words, all resource objects that are hierarchically related below (i.e., below and indented to the right from) the data storage system resource object 210-3 operate within the data storage system 102 represented by the data storage system resource object 210-3.

To complete this example, the user has also previously selected the front end director resource object 210-14 for further expansion. In response, the resource management process 122 has displayed the list of front end director resource objects 210-7 through 210-13 that each represent a front end director (i.e., a type of data interface device) operating within the data storage system 102 represented by the data storage system resource object 210-3. As thus explained, a user 108 can continue to expand/open or collapse/close resource objects 210 in order to navigate to (i.e., to cause to be displayed) those particular resource objects 210 of interest to the user 108 for management purposes.

At any time, the user 108 can use the input selector 203 to make a selection of multiple resource objects 210 by either selecting a resource object 210 that represents a group of resource objects 210 (e.g., a resource object that contains other resource objects, either displayed or collapsed, that are hierarchically related below the selected resource object 210) or by selecting multiple resource objects 210 located or displayed anywhere within the resource display area 170. While not shown in this example, upon doing so, the resource management process 120-2 applies any applicable selected resource tasks 208 to each selected resource object 210 to produce output referred to herein as resource information (not shown in FIG. 3). The resource management process 120-2 displays the resulting resource information within the shared output display area 217. No resource information is shown in the example graphical user interface 150 in FIG. 3.

Other aspects of the graphical user interface 150 shown in FIG. 3 include panel functions 215 located at the top of the resource display area 170 and at the top of the shared output display area 180. The panel functions 215 allow a user 108 to perform various display functions on the selected panel within the display area 170 or 180 in which that panel exists. For example, in FIG. 3, the panel function 215-1 is a horizontal split panel function which, if selected by a user 108, causes the resource management process 120-2 to divide the selected panel within the resource display area 170 or 180 (the display area in which that panel or window resides) into two different horizontally arranged panels (e.g., one on top of the other) within that resource display area 180. Also included is a vertical split panel function 215-2 which allows a panel in which this panel function 215-2 is selected to be divided (e.g., duplicated) in a vertical manner (side by side) resulting in two panels within the display area 170 or 180 for selection or presentation of different information. If multiple view panels exist in a display area (as will be explained and shown later) the user can select a particular panel to be a target panel. The user might select the title bar of the panel, for example, to make the panel a target panel. Thereafter, further resource task functions that are applied to resource object selections produce output that is displayed in the target panel. These operations of the graphical user interface 150 are discussed in more detail with respect to FIGS. 11 and 12.

Figure 4:
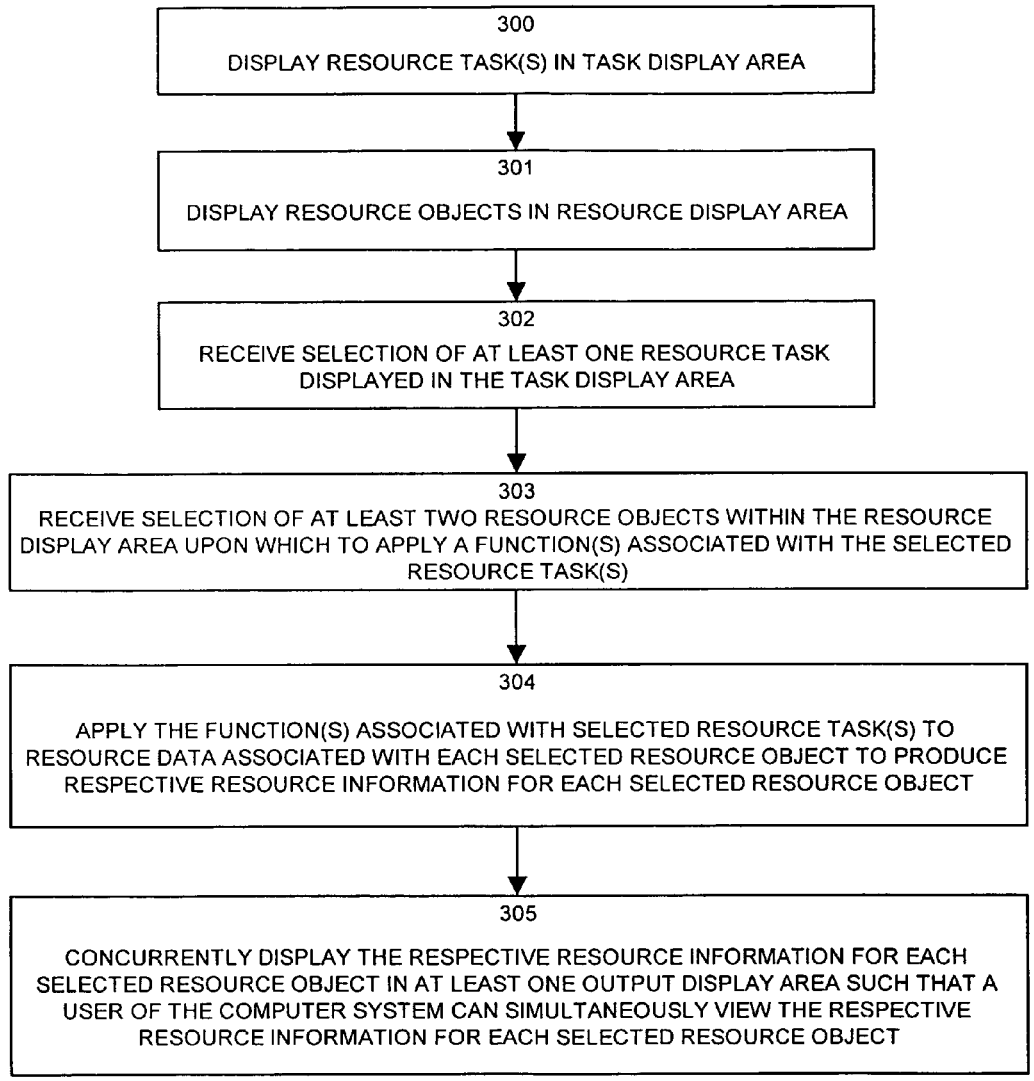
FIG. 4 is a flow chart of processing steps that show the general operation of a resource management process providing a graphical user interface configured according to embodiments of the invention.

FIG. 4 is a flow chart of the processing steps performed by embodiments of the invention that provide the functionality discussed above with respect to the graphical user interface 150. An example of an embodiment that performs the processing operations shown in FIG. 4 is the resource management process 120-2 operating within the management station computer system 110 in FIGS. 1 and 2.

In step 300, the resource management process 120-2 displays resource tasks 208 in the task display area 160. In one embodiment of the invention, step 300 includes the operations as explained above with respect to FIG. 3 and displays a plurality of task categories 205, each identifying a set of related resource tasks 208 based upon a commonality between functions associated with each resource task 208 in that category 205 and receives a selection of at least one task category 205 and in response to this selection, displays the set of related storage resource tasks 208 identified by the selection of task category 205 and hides from the display (i.e., removes from the graphical user interface 150) other sets of storage resource tasks 208 identified by task categories 205 that were not selected.

In step 301, the resource management process 120-2 displays resource objects 210 in the resource display area 170. In a preferred embodiment of the invention, the resource management process 120-2 concurrently displays the resource objects 210 hierarchically, according to pre-defined hierarchical relationships between certain of the resource objects 210, such that resource objects hierarchically related below other resource objects are hierarchically displayed below those other resource objects, while resource objects hierarchically related above other resource objects are hierarchically display above those other resource objects. This hierarchy conveys to the user 108 the relationships between the manageable resource objects.

In step 302, the resource management process 120-2 receives a selection of at least one resource task 208 displayed in the task display area 160. The selected resource task 208 (of which there may be more than 1) has an associated function, such as a systems management operation, which the resource management process 122 can apply (in step 304 below) to each of the selected resource objects 210 to produce resource information as a result of the function.

In step 303, resource management process 120-2 receives a selection of at least two resource objects 210 within the resource display area 170 upon which to apply the function (s) associated with the selected resource task 208. Preferably, step 302 allows a user 108 to provide a selection of a first resource object 210 and, while maintaining selection of the first resource object, allows the user 108 to provide a selection of one or more other (i.e., second, third and so forth) resource objects 210 within the hierarchically arranged resource display area 170 of resource objects. In other words, the user 108 can select multiple resource objects 210 within the resource display area 170 to which a function or functions of the selected task or tasks 208 are to be applied. The selected resources may be from the same, or from different hierarchies.

In step 304, the resource management process 122 applies the function or functions associated with the selected resource task or tasks to resource data (i.e., data structures or other information within the memory 112) that is associated with each selected resource object 210 to produce respective resource information (220 in FIG. 5, as will be explained) for each selected resource object 210.

As an example, a storage task category 205 might include a storage resource view task which a user 108 of the computer system 110 may select such that the step 304 of applying the function associated with the selected resource task applies a view function associated with the resource view task to all selected storage resource objects 210 (e.g., front end director resource objects 210-7 through 210-13) to produce storage resource information in a view format allowing the user to graphically view the storage resource information related to those selected resource objects 210. If, in step 302, the user 108 selects multiple resource tasks 208 which are to be applied to multiple resource objects 210, then in step 304, the resource management process 120-2 applies each respective associated function (i.e., each systems management operation) of each selected resource task 208, if applicable, to resource data (not shown in this figure) associated with each selected resource object 210 to which that task function can be applied. In other words, if a resource task 208 can be applied to any of the selected resource objects 210, in step 304 causes the resource management process 120 to apply that function to that resource object 210 to produce resource information which represents the output of that function.

In step 305, the resource management process 120-2 concurrently displays the respective resource information for each selected resource object 210 in the shared output display area 180 such that the user 108 of the computer system 110 can simultaneously view the respective resource information for each selected resource objects 210. Stated differently, in step 305, the resource management process 122 displays, within the graphical user interface 150, resource information produced as a result of applying each respective task function associated with all selected tasks 208 to any selected resource objects 210 to which those functions may properly be applied. This allows, for example, the user 108 to concurrently compare storage resource information from applying multiple functions associated with multiple storage resource tasks 208 to multiple storage resource objects 210 such as a front-end directors 210-7 through 210-13. An example of this operation is illustrated with respect to graphical user interface 150 shown in FIG. 5.

Figure 5:
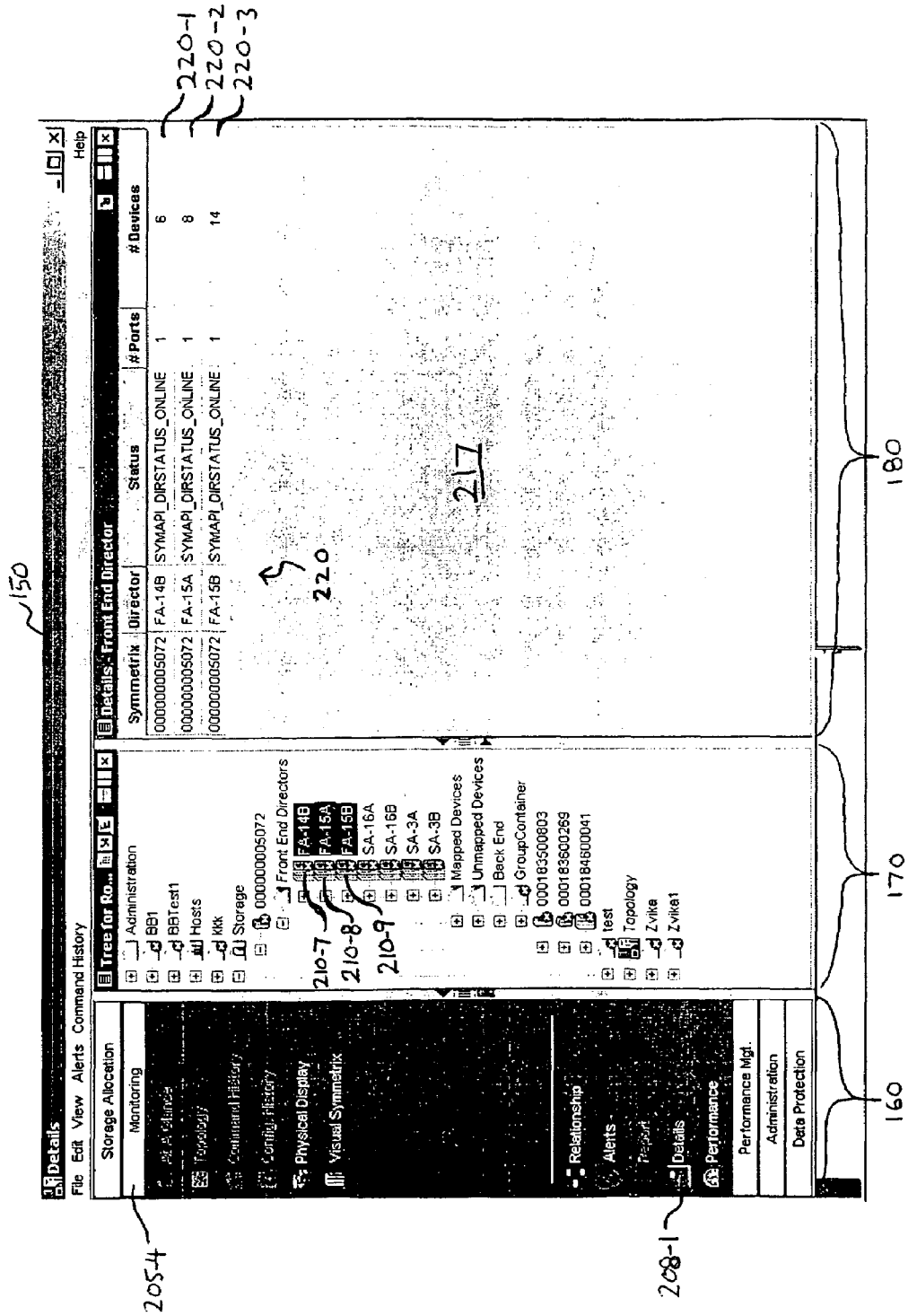
FIG. 5 shows an example of a graphical user interface configured according to embodiments of the invention in which a selected resource task is applied to multiple selected resource objects to concurrently display resource information for each selected resource objects.

FIG. 5 shows another example screen shot of the graphical user interface 150 produced by embodiments of the invention that illustrates the processing steps discussed above. In this example the user 108 has selected the monitoring task category 205-4 in the task display area 160 in which case the resource management process 120-2 presents the monitoring tasks for selection by the user 108. Thereafter, the user selects the "Details" resource task 208-1. In the resource display area 170, the user 108 selects three specific front end director resource objects: "FA-14B" 210-7, "FA-15A" 210-8 and "FA-15B" 210-9. The user 108 can select multiple resource objects 210, for example, by depressing a shift key on a keyboard input device (not shown) while concurrently using an input device 116 such as a mouse (FIG. 2) to select multiple resource objects 210 (referred to as shift-clicking). In response, the resource management process 120-2 applies a function associated with the "Details" resource task 208-1 (e.g., a systems management operation or function which accesses the details of a particular selected resource object 210) to each selected front end director resource objects 210-7 through 210-9 in order to produce, as output, respective resource information 220-1 through 220-3. Resource management process 120-2 concurrently displays (step 305 in FIG. 4) the resource information 220-1 through 220-3 for each respective resource objects 210-7 through 210-9 in a single view panel 217 within the shared output display area 180.

The processing explained above and shown with respect to graphical user interface 150 in FIG. 5 and other figures allows a user to compare and contrast the detailed resource information for each selected resource object 210. Since the operation of embodiments of the invention allows a user to select multiple resource objects 210 and to simultaneously apply a selection functions associated with multiple resource tasks (only one task applied in this example), the system of the invention allows a systems manager or other user to precisely manage network resources in a consistent manner. For example, if a user desires to apply a particular function or functions associated with one or more resource tasks 208 to numerous managed resources within a network 100, the systems manager user 108 simply needs to select the task or tasks which are to be applied to those resources objects 210 and further needs to select each of the resource objects 210 to which those tasks or functions are to be applied. The system of the invention then dynamically applies the function(s) associated with each selected task to each selected resource in an automated manner to produce resource information 120 output within the shared output display area 180.

The operation of embodiments of the invention avoids a common problem in conventional system management applications that occurs when a user attempts to configure numerous resources (e.g., devices) in the same way. Since conventional resource management applications generally do not allow configuration functions (e.g., tasks) to be applied to multiple system resources (some of which may be different from each other), then each resource (e.g., each device) must be configured in a separate operation from the others.

Figure 6:
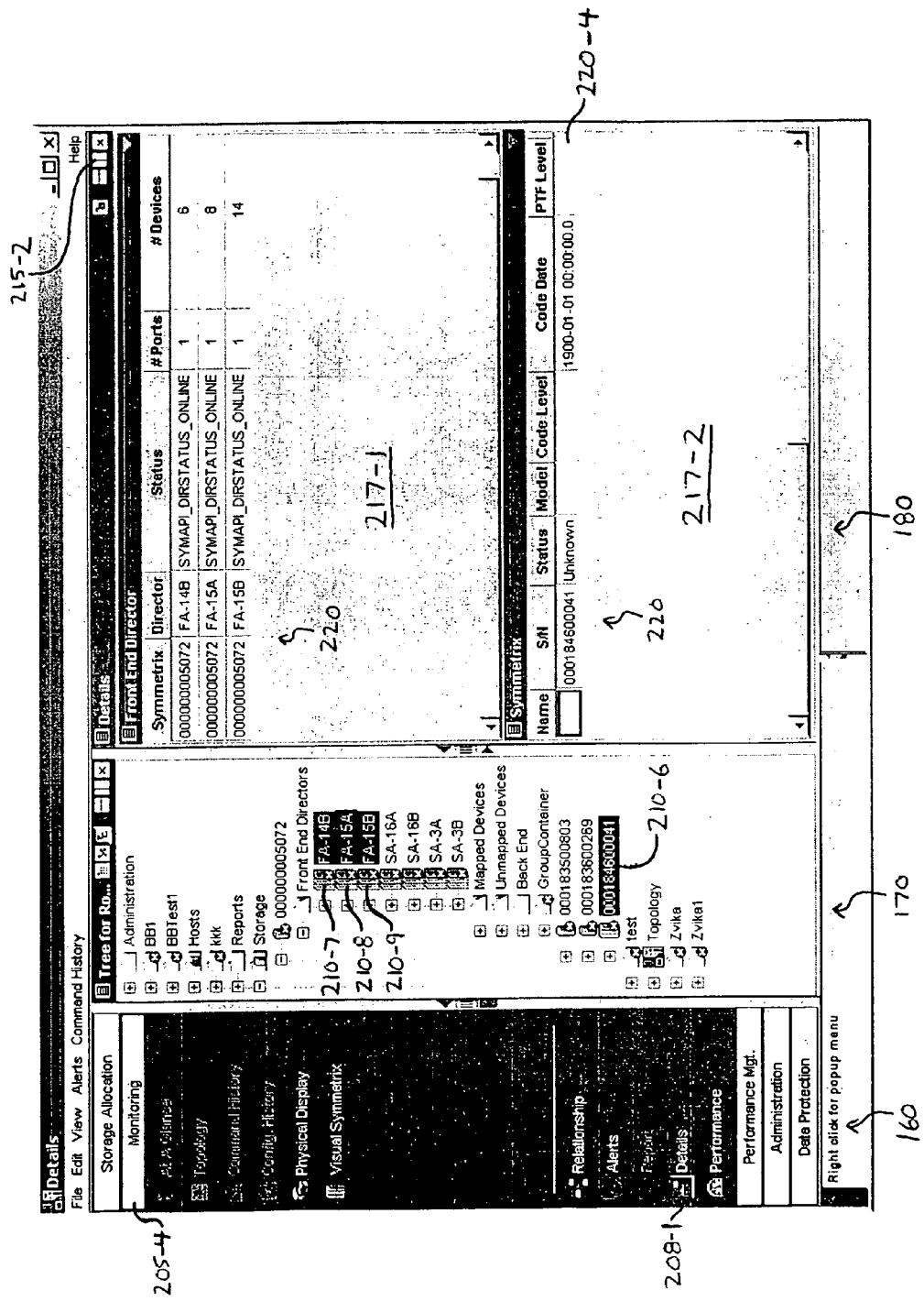
FIG. 6 shows an example of a graphical user interface configured according to embodiments of the invention in which a resource task selection is applied to multiple resource objects of different types to produce concurrently displayed resource information for each selected resource object.

FIG. 6 illustrates another screen shot of an example graphical user interface 150 provided according to embodiments of the invention. The resource management process 120-2 of embodiments of this invention produces the graphical user interface 150 in FIG. 6 as a result of the user 108 continuing to operate the graphical user interface 150 shown in FIG. 5.

In the graphical user interface 150 in FIG. 6, the user 108 has selected an additional resource object 210-6 which corresponds to a different type of resource object than the concurrently selected front end director resource objects 210-7 through 210-9. In other words, resource object 210-6 represents a complete data storage system 102 within the network 100 whereas resource objects 210-7 through 210-9 represent individual front end directors that operate within the specific data storage system 102 represented by the data storage system resource object 210-3 (FIG. 3). Nonetheless, the operation of the resource management process 120-2 as configured according to embodiments of the invention applies the function associated with the selected resource task 208-1 (i.e., the Details resource task) to resource data associated with the additionally (and concurrently) selected resource object 210-6 in order to produce resource information 220-4 that represents the output of the function of the resource task 208-1 as applied to resource data (not shown) associated with that resource object 210-6. Since the resource object 210-6 represents a data storage system instead of a front-end director (i.e., is a different type of resource object), then the resource management process 120-2 produces an additional view panel 217-2 for displaying the resource information 220-4.

This aspect of embodiments of the invention provides for the ability of displaying different types of resource information 220 produced is a result of applying one or more functions from one or more selected resource tasks (which also may be different from each other) upon resource data associated with different types of concurrently selected resource objects. In this manner, embodiments of the invention provide a powerful systems management application via unique graphical interface 150. By being able to compare resource information 220 for multiple resource objects of different types, a user 108 is able to gather extensive information about, and manage and configure many different types of managed resources within the network 100.

Figure 7:
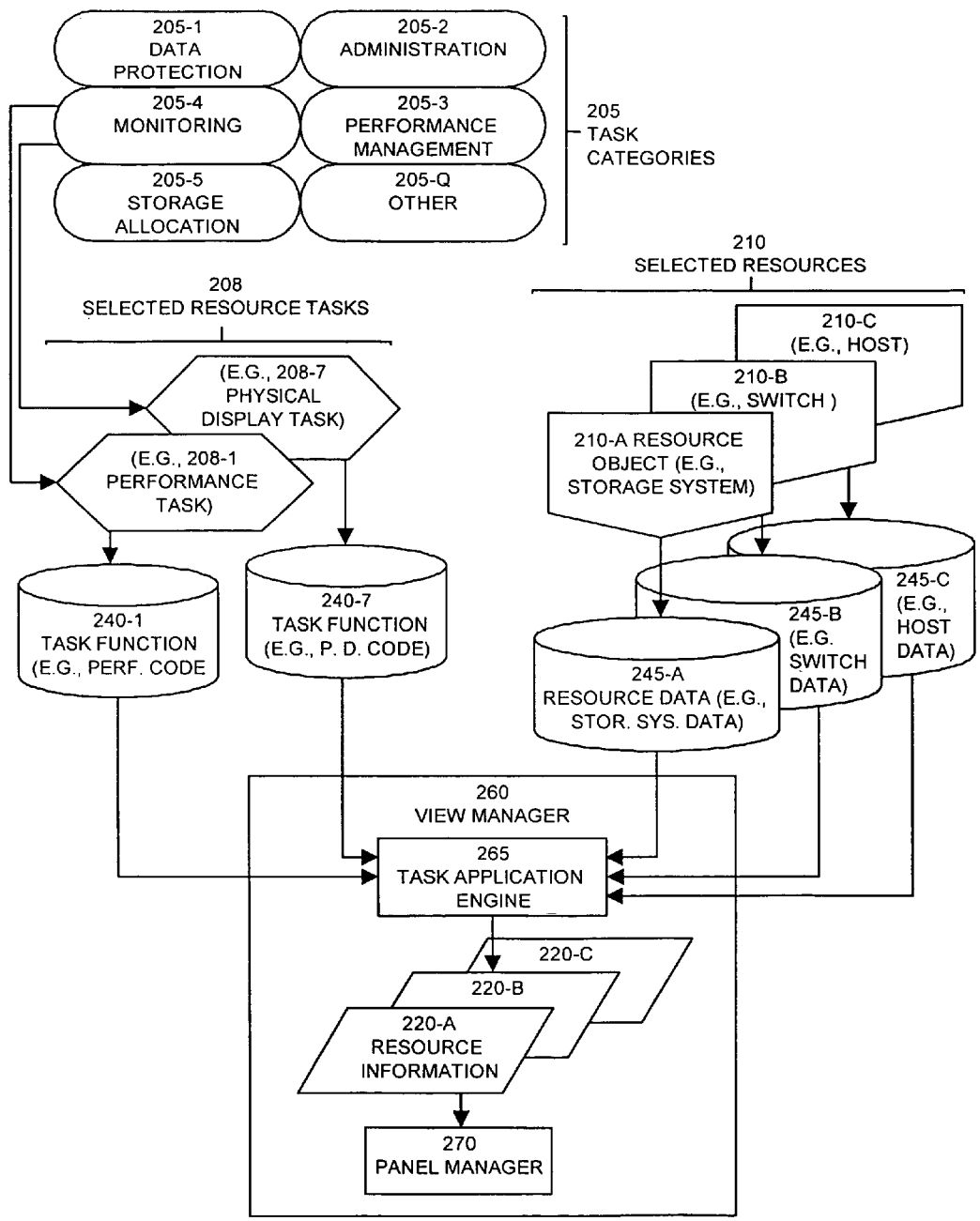
FIG. 7 is a data flow diagram that illustrates a flow of data used by a view manager configured according to embodiments of the invention to produce the output of the graphical user interface of embodiments of the invention.

FIG. 7 illustrates an internal software architecture and data flow diagram for a resource management application 120-1 and process 120-2 (collectively referred to as the resource manager 120 for this description) as configured according to an example embodiment of the invention. The resource manager 120 includes a sub-process referred to in this example as a view manager 260. The view manager 260 includes a task application engine 265 and a panel manager 270. The architecture in FIG. 7 also includes a plurality of task category data structures 205 which contain corresponding definitions and identities of resource tasks 208 associated with each task category 205. The resource manager 120 also includes a task function definition 240 that corresponds to each resource task 208. The task function definition 240 generally represents the code, logic instructions, routines, procedures, library functions or other operational entities that allow the resource manager 120 to perform the particular corresponding task 208. Likewise, for each resource object 210, the resource manager 120 maintained a corresponding set of resource data 245 associated with that resource object 210. The resource data 245 for a particular resource object 210 represents the manageable data, logic or other information that can be manipulated by the resource manager 120 during management of resources within the network 100.

In operation of the example architecture in FIG. 7, a user 108 selects one or more resource tasks 208 from one or more task categories 205. In this specific example, the user has selected a "performance" task 208-1 and a "physical display task" 208-7 from within the monitoring task category 205-4. Accordingly, the task application engine 265 to receives the identities of the respective task functions 240-1 and 247 which define the particular systems management operations to be carried out as requested by the user 108. Also in this specific example, the user 108 has selected three resource objects 210-A through 210-C, which happened to correspond in this example to a data storage system 201 (FIG. 1), a storage area network switch 103, and a host computer system 104. As a result of the selection of these resource objects 210, the task application engine 265 receives the identities (e.g., pointers) of the resource object data structures 245-A through 245-C that corresponds to each of these resource objects 210.

Generally, when such selections are complete, the task application engine 265 within the view manager 260 applies each task function 240 to each set of resource data 245 to which it is appropriate to do so. In other words, the task application engine 265 is capable of determining which task functions 240 can be applied to which sets of resource data 245 in order to produce corresponding respective sets of resource information 220. It may be the case that each task function 240 is capable of being applied to the resource data 245 for each selected resource object 210. Alternatively, perhaps some task functions have no meaning if applied to certain sets of resource data 245 for certain selected resource object 210. In such cases, the task application engine 265 does not apply that task function 240 to that set of resource data 245. As a result of applying the task functions 240 to the resource data 245, the task application engine 265 produces corresponding sets of resource information 220-A through 220-C. Thereafter, the panel manager 270 can obtain access to the sets of resource information 220 and can properly display the resource information 220 within one or more view panels 217 within the shared output display area 180 of the graphical user interface 150.

Figure 8:
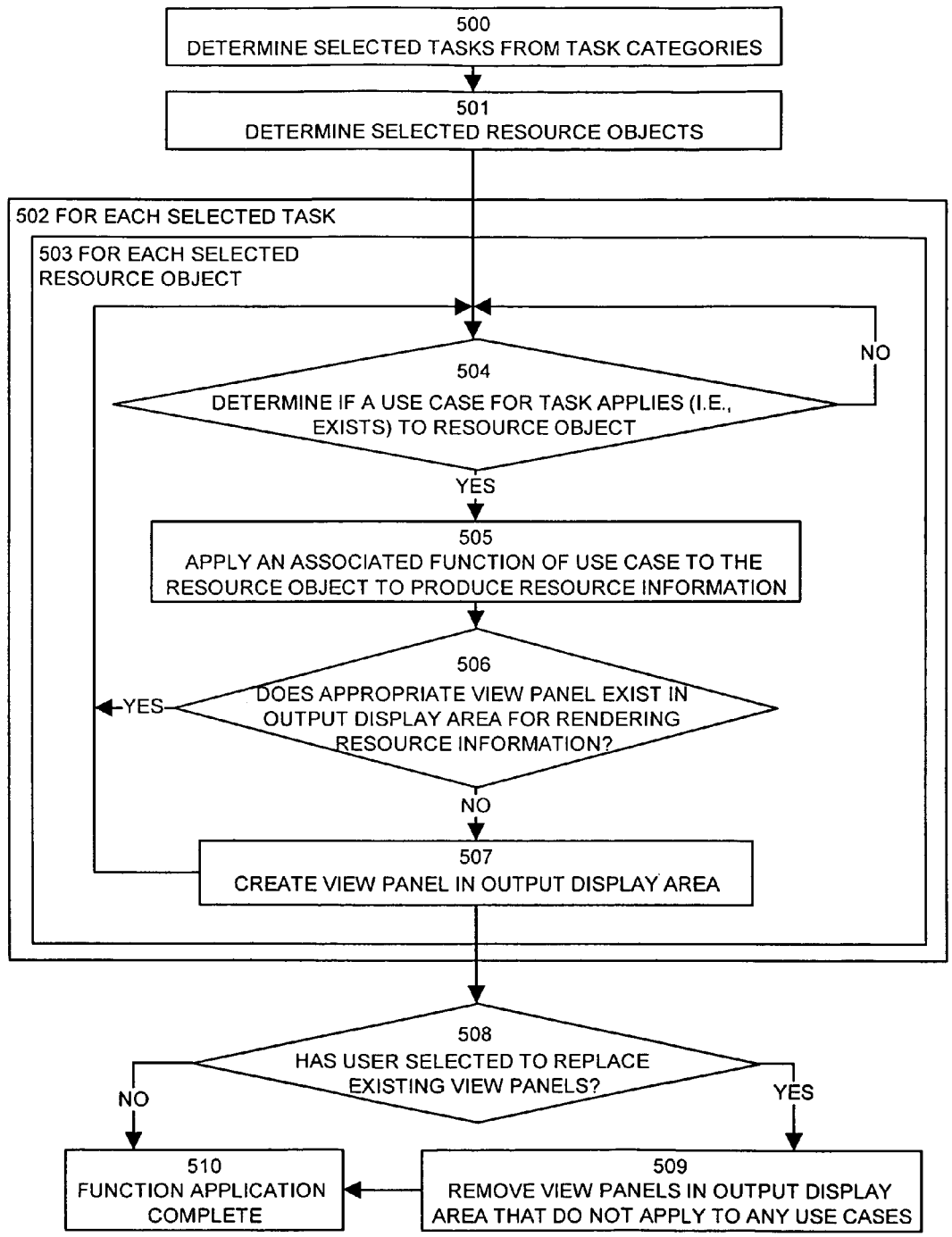
FIG. 8 is a flow chart of processing steps as performed by a resource management process that includes a view manager configured according to embodiments of the invention to apply multiple selected tasks to multiple selected resource objects.

FIG. 8 is a flow chart of the processing steps performed by the resource management application 120-1 and resource management process 120-2 configured according to one embodiment of the invention. Preferably, the processing operations shown in FIG. 8 are performed by the view manager 260 (i.e., certain steps performed by the task application engine 265 all others may be performed by the panel manager 270) illustrated in the aforementioned architecture discussed with respect to FIG. 7.

In step 500, the task application engine 265 operating in the management station computer system 110 determines which selected tasks 208 have been selected from which selected task categories 205. As a result, the task application engine 265 is aware of the identities of the various task functions 240 which the user 108 desires to apply to resource objects 210. It is to be understood that it may be the case that a single resource task 208 is accomplished or is carried out using multiple task functions 240. As such, the system of the invention allows a user to, for example, define a particular resource task 208 that accomplishes multiple systems management functions 240 in which case, the task application engine 265 receives the identity of a script or other task definition which contains the identities of all of the particular task functions 240 associated with a particular selected resource task 208.

Next, in step 501, the task application engine 265 determines the identities of all of the selected resource objects 210. As a result of this processing, the task application engine 265 is aware of the identities of the various sets of resource data 245 which correspond to the selected resource objects 210 to which the user 108 desires to apply the selected task functions 240 obtained in step 500.

Next, in steps 502 and 503, the task application engine 265 enters two execution loops. The resource management process 120-2 performs the first loop 502 for each task function 240, the identities of which result from the selection of respective resource tasks 208. Then, for each selected task 208, the resource management process 120-2 performs a second loop 503 for each selected resource object 210.

Next, step 504, using the example in FIG. 7 for the first selected task 208-1 and the first selected resource object 210-A, the task application engine 265 determines if a "use case" for the selected task 208-1 (i.e., for the task function 240-1) applies to that particular resource object 210-A (i.e., to the set of resource data 245-A corresponding to the selected resource object 210-A).

A "use case" for a particular resource task 208 is an indication within the task function 240 for the selected task 208 that indicates whether or not that task function 240 is to be or can be applied to a particular set of resource data 245. This determination may be made, for example, by listing within each task function 240 the particular types of resource objects 210 to which that task function 240 may be applied. Alternatively, a particular task 208 (e.g., performance task 208-1) may define a separate task function 240 (e.g., 240-1 and other task functions for the performance task 208-1 that are not shown in this example) for each different possible type of resource object 210 to which the task 208 can be applied. In such embodiment, each separately defined task function 240 represents a different "use case" and if there is a task function 240 for one of the particular type of selected resource objects 210, then a use case for that task 208 applies to that type of resource object 210.

As such, in step 504, the task application engine 265 can determine if the task 208 being processed in the loop 502 is to be applied to the resource objects 210 (some, all or none) being processed in the loop 503. If no use case applies to the resource object 210 currently being processed by the loop 503, the processing proceeds back to the top of the loop 503 in order to process the next resource object 210.

If a use case exists for a particular task 208, then processing proceeds to step 505 in which the task application engine 265 applies the proper associated function 240 for the use case of the task 208 to the resource data 245 for the resource object in order to produce respective resource information 220 as output from the task function 240.

Next, processing proceeds to step 506 at which point that task application engine 265 determines if an appropriate view panel 217 exists within the shared output display area 180 of the graphical user interface 150 for rendering the resource information 220. If an appropriate view panel 217 does exist that can render the resource information 220 produced as a result of the processing in step 505, then processing proceeds from step 506 back to step 504 in order to process the next set of resource data 245 for the next selected resource object 210. Alternatively, if a view panel 217 does not exist that is appropriate for rendering the resource information 220, then processing proceeds to step 507.

In step 507, the resource application process 120-2 creates a new view panel 217 (which will receive the resource information, as will be explained with respect to FIG. 9) within the shared output display area 180 on the graphical user interface 150 and processing proceeds back to the top of the loop 503 in order to process the next selected resource object 210.

The processing of each loop 502 and 503 continues until each resource object 210 has been processed by each task function 240 associated with each selected resource task 210. In this manner, resource information 220 is produced for all task functions 240 for each set of resource data 245 to which those task functions can be applied. It is to be understood that the resource information 220 can be different for each set of resource data 245 to which each task function 240 is applied. For instance, one set of resource information 220-A may represent performance information that is to be preferably rendered in a network topology graph or map within a certain view panel 217 on the graphical user interface 150. In another case, the set of resource information 220-B may represent statistical data concerning the performance of the particular selected resource object 210-B that is best rendered in another view panel 217 as a table of resource information 220 as shown in the examples in FIGS. 5 and 6.

Upon completion of the processing loops 502 and 503, processing proceeds to step 508 in which the task application engine 265 determines if a user 108 operating the graphical user interface 150 has selected to replace the existing view panels 217 (i.e., view panels 217 which may already exist within the shared output display area 180 of the graphical user interface 150) with new view panels 217 produced as a result of the most recent user selections of resource tasks 208 and resource objects 210. It may be the case, for example, that the user desires to leave any existing view panels 217 on the shared output display area 180 in addition to creating new view panels 217 which display the resource information 220 produced as a result of the most recent user selections. In such cases, processing proceeds to step 510 in which the function application as performed by the task application engine 265 is complete.

Alternatively, in step 508, if the user 108 operating the resource management process 120-2 desires to replace the existing view panels 217 that may already exist within the shared output display area 180, then processing proceeds to step 509.

In step 509, the task application engine 265 removes any existing view panels 217 in the shared output display area 180 that do not apply to any use cases which were determined, in step 504, to apply to any selected resource objects 210. In other words, if a view panel is currently on display within the shared output display area 180 of the graphical user interface 150 and that view panel is appropriate for displaying the resource information 220 produced as a result of the processing in the loops 502 and 503, then step 509 does not remove that view panel 217. However, if view panels 217 exists in the shared output display area 180 which do not relate to, or have the ability to display, the resource information 220 produced as a result of the processing of the loops 502 and 503, then step 509 removes those view panels 217 for the shared output display area 180. Thereafter, processing proceeds to step 510 at which point the task application engine 265 has completed applying the task functions 240 to every set of resource data 245 to which they may be applied.

At this point, the panel manager 270 within the view manager 260 can process the resource information 220 produced as a result of the processing in FIG. 8 in order to display the resource information 220 within the shared output display area 180 of the graphical user interface 150. An example of this processing is illustrated in FIG. 9.

Figure 9:
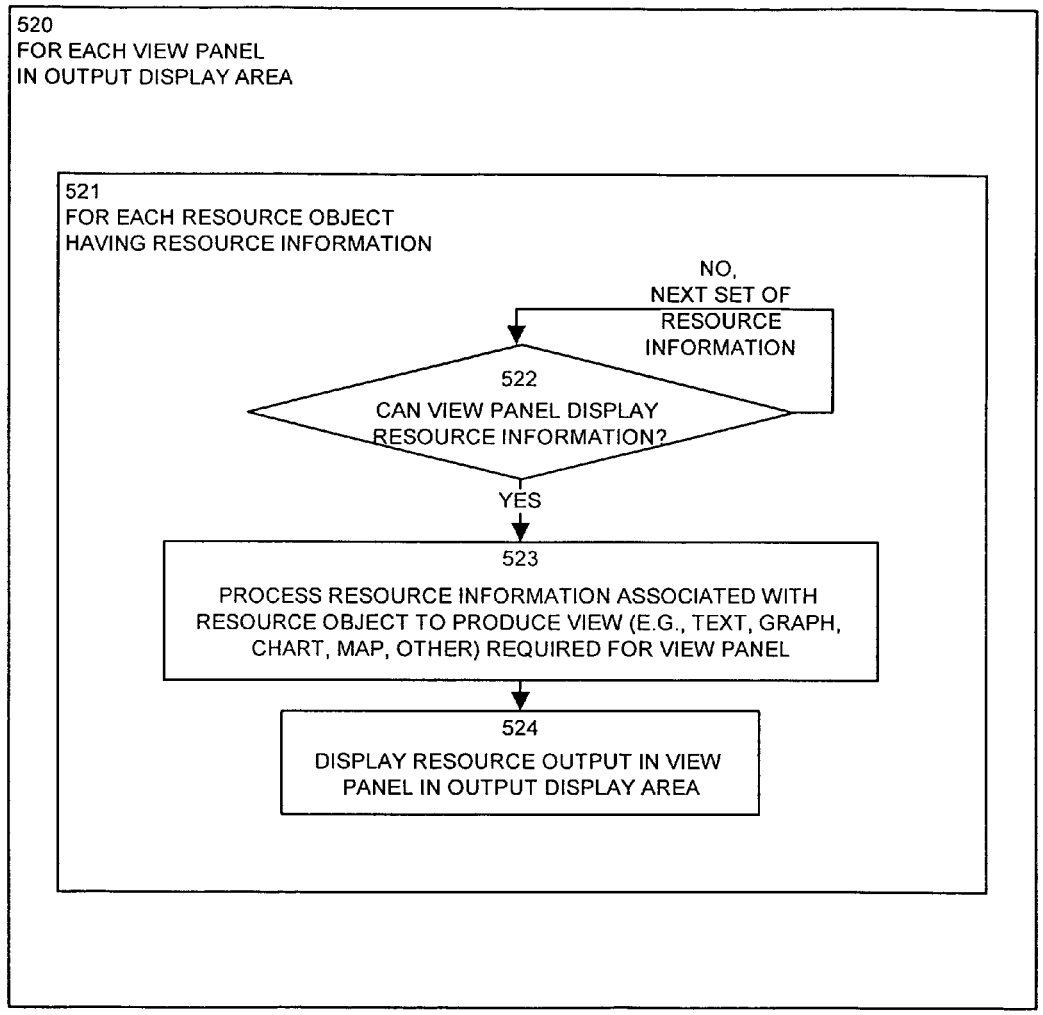
FIG. 9 is a flow chart of processing steps as performed by a resource manager to concurrently display resource information for each selected resource object to which a selected task is applied in a graphical user interface configured according to embodiments of the invention.

FIG. 9 illustrates a flow chart of the processing steps performed by the resource management application 120-1 and process 120-2 configured according to one embodiment of the invention. In particular, the processing operations shown in FIG. 9 are preferably performed by a panel manager 270 operating within the computer system 110 in order to update the shared output display area 180 of the graphical user interface 150 provided according to embodiments of this invention.

Initially, the panel manager 270 enters a loop 520 which performs processing for each view panel 217 that exists (i.e. that is displayed) within the shared output display area 180. Recall from the processing discussed above with respect to FIG. 8 that after the task application engine 265 has completed its processing, the shared output display area 180 contains a proper set of view panels 217 which are each capable of rendering some (or all) of the resource information 220.

Next, the panel manager 270 enters another processing loop 521 which operates for each resource object 210 that has corresponding resource information 220 for the current view panel 217 that is to be displayed within the shared output display area 180 on the graphical user interface 150. In other words, processing loop 521 is performed for each set of resource information 220-A through 220-C as shown in the example configuration in FIG. 7.

In the processing loop 521, in step 522, the panel manager 270 makes a determination if the current view panel 217 (selected in loop 520) can display resource information 220 for the current resource object 210 (selected in loop 521). If the current view panel 217 can display resource information 220 for the current resource object 210, processing proceeds to step 523.

In step 523, the panel manager 270 processes the resource information 220 associated with the current resource object 210 to produce a view of the resource information 220 required for the view panel 217. The view may be, for example, a data structure in the memory system 112 that contains a text view, a table view, a graph, chart, map or other view or image which may be dependent upon the content and/or the required display criteria associated with a particular set of resource information 220 as it relates to the particular current view panel 217.

Next, in step 524, the panel manager 270 displays the view of the resource information within the current view panel 217 in the shared output display area 180 of the graphical user interface 150. This process repeats for each view panel for each set of resource information. The same resource information may be thus displayed in multiple view panels, in the same manner, or in different forms. For instance, if one view panel is optimized for displaying graphical data such as topology maps, then any resource information that may be rendered as a topology map may be displayed in that view panel, whereas the same resource information may also be rendered in tabular form and thus a view panel that is optimized for presenting tabular data can also present this resource information.

In this manner, the processing of embodiments of the invention is able to present the resource information 220 to the user 108 in one or more view panels 217. The processing steps 522 to 524 occur for each resource object having resource information 220 for each view panel 217 in the shared output display area 180. As such, multiple view panels 217 may exist and each can display resource information related to one or more selected resource objects 210.

Figure 10:
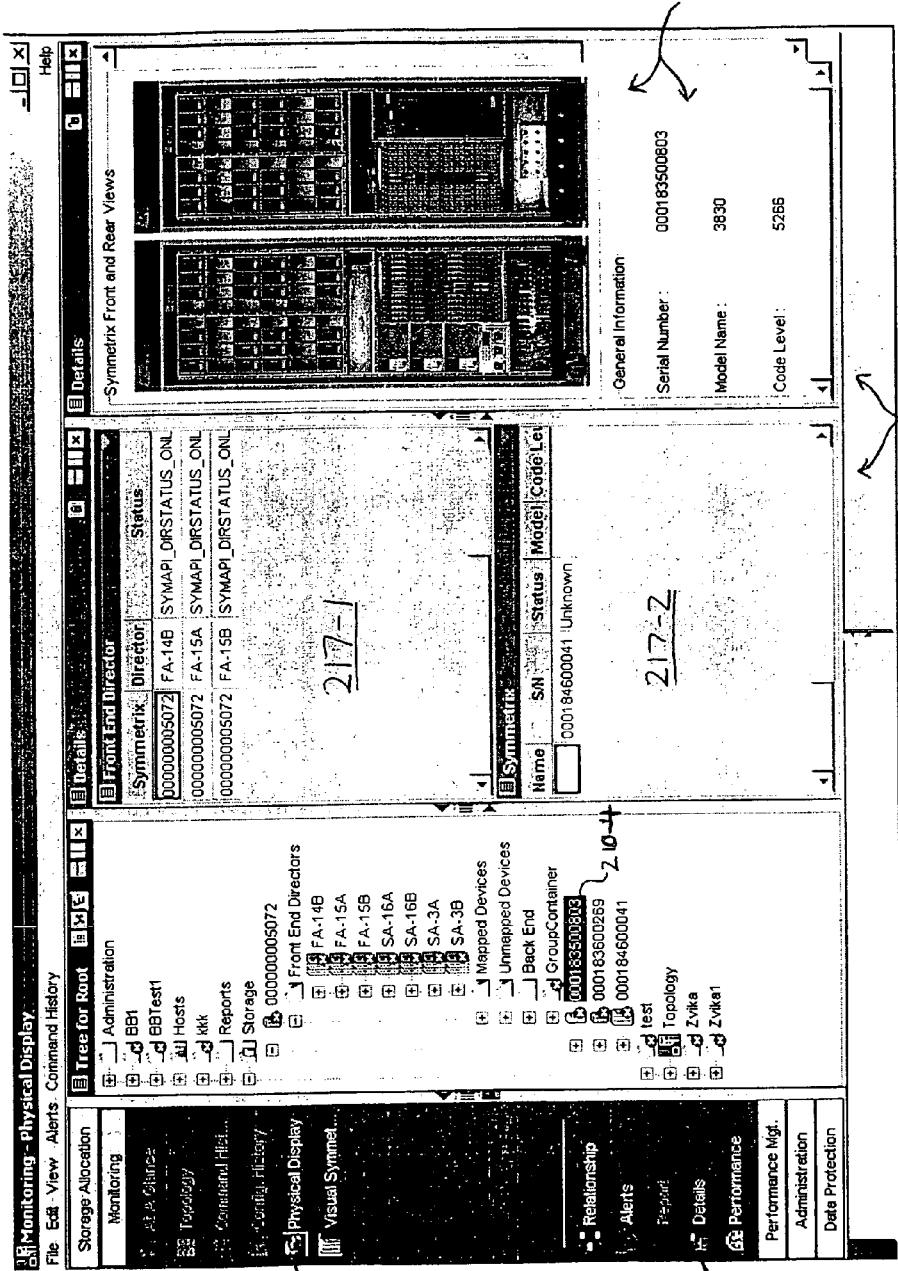
FIG. 10 shows an example of a graphical user interface configured according to embodiments of the invention in which multiple view panels exist for the display of resource information produced from multiple selected tasks.

FIG. 10 illustrates an example of the graphical user interface 150 in which multiple view panels 217-1 through 217-3 are displayed within the shared output display area 180 as a result of the user 108 selecting two resource tasks 208-1 (the "Details" resource task) and 208-2 (a "Physical Display" resource task) that are applied to a single selected resource object 210-4 (a data storage system resource object).

As illustrated, the resulting shared output display area 180 contains three view panels 217-1 through 217-3. The first two view panels 217-1 and 217-2 look much the same as they did with respect to the example in FIG. 6. However, in this example, since the user 108 has selected an additional resource task 208-2, and the task application manager 265 (FIG. 7) has applied the task functions 240 (associated with the tasks 208-1 and 208-2) to the selected resource object 210-4 (only one resource object 210 selected in this example), the task application manager 265 creates (in step 507 in FIG. 8) an additional view panel 217-3 since the resource information 220 contains physical display data regarding the physical view of the selected data storage system resource object 210-4 and is thus not preferably viewable in the view panels 217-1 and 217-2. In other words, during the processing of FIG. 8, the task application manager 265 determined that the existing view panels 217-1 and 217-2 were not optimized for displaying physical view information regarding the selected data storage system resource 210-4. As a result, the task application manager 265 creates (in step 507) a third view panel 217-34 to handle the display of such resource information.

Then, during the processing of the panel manager 270 with respect to FIG. 9, in step 522, the panel manager determines that the resource information 220 is not preferably to be displayed within the view panels 217-1 and 217-2 since the two view panels 217-1 and 217-2 cannot properly display the graphical information. As such, the panel manager 270 performs steps 523 and 524 for the physical display resource information 220 only with respect to the view panel 217-3. In this manner, the shared output display area 180 displays multiple types of information for multiple selected resource objects which are acted upon by functions defined by one or more selected resource tasks from the task display area 160.

As previously mentioned with respect to the example graphical user interface 150 shown in FIG. 3, interface 150 provides other view panel management functions as well. For example, the panel functions 215 shown in FIG. 3 allow a particular view panel (e.g., 217) to be split either horizontally or vertically which allows the user 108 the ability to further display resource information 220 or selectable resource objects 210 (in the case of splitting a panel within the resource display area 170).

Figure 11:
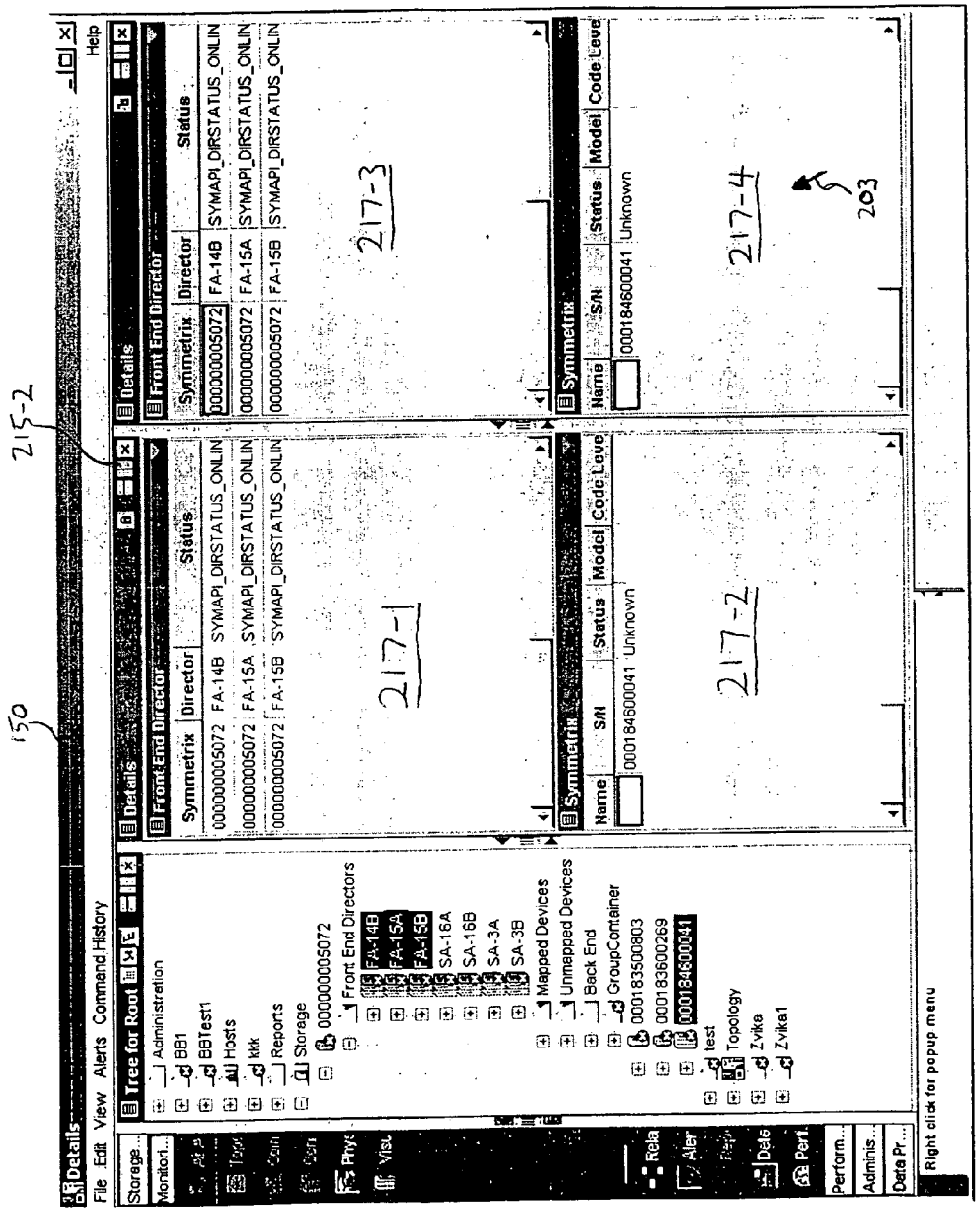
FIG. 11 shows an example of a graphical user interface configured according to embodiments of the invention which demonstrates split panel function and target panel selection capabilities of the graphical user interface configured according to embodiments of this invention.

FIG. 11 illustrates an example in which the user 108 of the resource management process 120-2 operating in the computer system 110 decides to perform a vertical split of the set of view panels 217-1 and 217-2 shown in the example graphical user interface 150 shown in FIG. 6 (discussed above). In particular, to achieve the resulting graphical user interface 150 shown in FIG. 11, the user 108 simply selects the vertical split panel function 215-2 on the top of the view panel 217-1 shown in the graphical user interface 150 in FIG. 6. This causes the resource management process 120-2 to vertically divide the view panels 217-1 and 217-2 into duplicate view panels thus producing to additional view panels 217-3 (the duplicate of 217-1) and 217-4 (the duplicate of 217-2). This feature of the graphical user interface 150 is extremely useful for configuring different manageable resources of the same or different types while concurrently viewing the resource information 220 for other resources which were, for example, previously configured.

To illustrate the usefulness of this feature of embodiments of the invention, once the resource management process 122 presents the graphical user interface 150 to the user 108 as it appears in FIG. 11, that user may select one of the four view panels 217-1 through 217-4 as a "target panel." Such a selection may simply be made by the user moving the input selector 203 over one of view panels 217, such as 217-4 in this example, and clicking anywhere on the view panel 217-4 (e.g., on the title bar of the view panel). By doing so, the resource management process 120-2 treats or considers the view panel 217-4 to be the "target panel" for future task processing operations on additional selected resource objects 210 that may use additional selected resource tasks 208.

As an example, if the user 108 selects the view panel 217-4 to be a target view panel, and then further selects additional resource tasks 208 that the resource management process 120-2 is to apply to the current set of selected resource objects 210, the resource information 220 produced as a result of such additional selections will be display within the target panel 217-4. In addition, if the user selects additional resource objects 210 from the resource display area 170, the results of applying the currently selected set of resource tasks 208 to these additional or newly selected resource objects 210 will be presented to the user 108 within the target view panel 217-4. That is, once a target view panel is selected and one or more resource tasks 208 is/are applied to a selection of resource objects, the resource information 220 is shown in the selected target panel while other view panels can remain unchanged. Then, if another resource object 210 is selected, the already selected resource task will immediately be applied to that newly selected resource objects 210 and the resource information for this operation will be added or appended to the resource information already in existence in the target panel.

By performing a panel function 215 upon the view panel 217, the user is able to duplicate or split the single few panel 217 into duplicate view panels. Then, the user is able to select one or more of these duplicate view panels to be a target panel for future task operations. As additional resource objects are selected, the current selection of resource tasks is automatically applied to the additionally selected resource objects and the target panel receive the resource information 220 produced as a result of this operation. In this manner, the user is able to perform a first set of systems management operations as explained herein and see the results in one or more view panels. Then, the user 108 can select certain of the existing view panels for duplication and can perform additional systems management tasks in the duplicate versions of the view panels which operate as target panels to receive the new resource information. The non-target panels which were originally split can remain within the shared output display area 180 for concurrently viewing with the new resource information 220 produced as a result of selecting new or different task functions 208 or new or different resource objects 210 for which the new resource information is displayed within the target view panels 217.

This aspect of the system of the invention provides a powerful systems management tool for management of network resources since certain management tasks can be performed and the results of those tasks can be left within certain view panels 217 in the shared output display area 180 while other view panels are used to further perform additional systems management operations. The results of those additional systems management operations can be viewed in other view panels without disturbing the results of the former systems management operations previously carried out. This allows the user 108 to compare and contrast the resulting operations of many different systems management functions or tasks without having to remember or write down or somehow otherwise determine what those former results were for tasks they were carried out in the past. In addition, such each view panel is configured with a scroll bar, if many view panels 217 are produced within the graphical user interface 150, the user 108 may scroll each view panel 217 view its entire contents.

Figure 12:
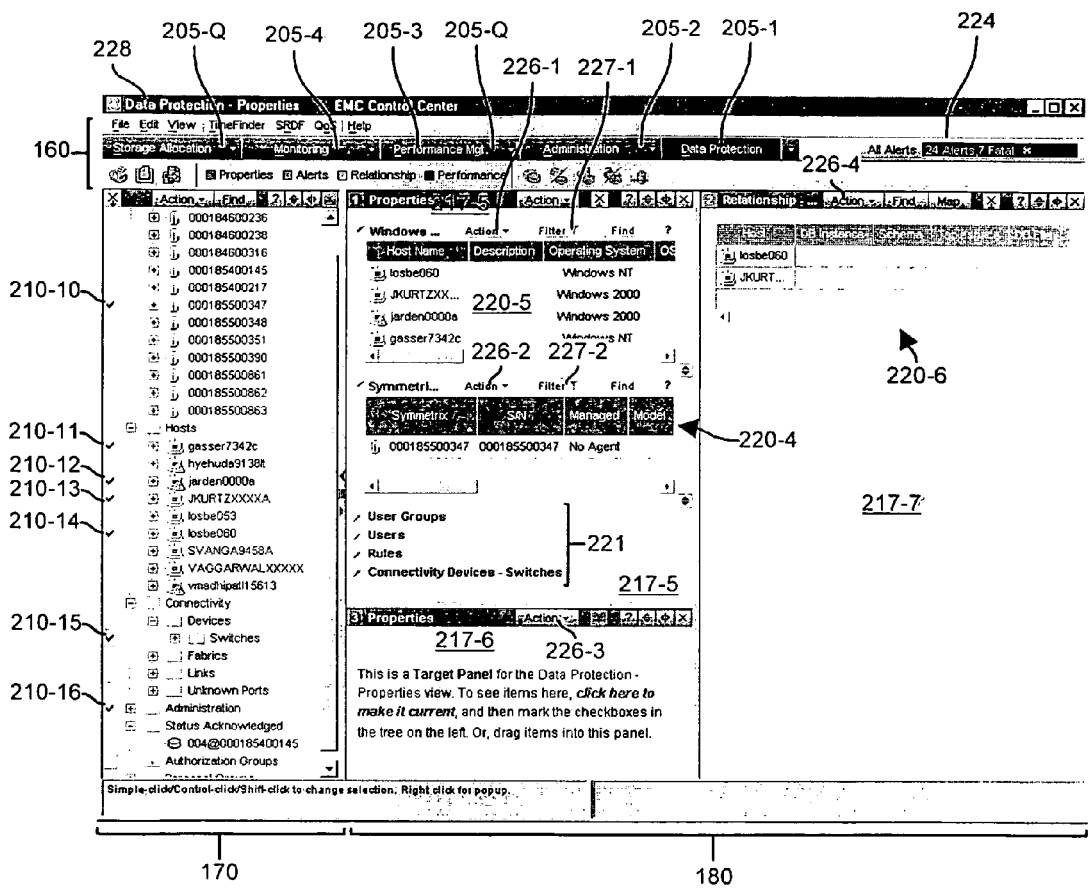
FIG. 12 illustrates another example of a graphical user interface configured according to one embodiment of the invention.

FIG. 12 illustrates another example of a graphical user interface 150 configured according to one embodiment of the invention. In this example graphical user interface 150, the task display area 160 operates as a series of pull-down menus, one for each selectable task category 205-1 through 205-Q. When a user activates (i.e., when a users pulls down) a pull-down menu 205, the user is presented with a list of selectable resource tasks 208 (no specific menu choices shown in this figure) associated with the task category 205 for that menu. In this particular example, the user has already selected a "Data Protection" task category 205-1 and has selected a "Properties" task 208-12, as indicated by the title bar "Data Protection—Properties" 228 in the graphical user interface 150.

Using the graphical user interface 150 in FIG. 12, the user can also select one or more resources 210 (i.e., resource objects) from the resource display area 170. The hierarchical display of resources 210 in the resource display area 170 allows the user to intuitively select resources for which that user would like to apply the resource task(s) selected from the pull-down menu task category(s) 205. In this example, the user selects resources 210-10 through 210-16 by selecting or activating the respective check box to the left of each listed resource. A check mark in a check box indicates to the user that that resource has been selected for application of the function associated with the selected task from the task category menu 205. Note that selected resource 210-10 is a "Symmetrix" data storage system type resource, while selected resources 210-11 through 210-14 are "Host" type resources, while resources 210-15 and 210-16 are "Connectivity" and "Administration" type resources, respectively. Embodiments of the invention thus allow a user to select different types of resources for which to apply one or more different selected tasks.

Also note that the selected "Administration" resource object 210-16 allows the user to select all resources below the "Administration" resource in the object hierarchy shown in the resource selection area 170. That is, since the user has not expanded the "Administration" resource object 210-16 in the illustrated hierarchy, as shown by the "+" to the left of the "Administration" title for this resource object 210-16, there are one or more resources under or beneath the selected "Administration" resource object 210-16 (such selection indicated by the check box to the left of the Administration resource object 210-16) to which the user will apply the selected task, which is a Data Protection task in this example. To this end, embodiments of the invention allow a user to select a group of resources as shown in this example by the selection of the single Administration resource object 210-16. By selecting a group in this manner, the user intends to apply the selected task(s) to the entire set of resources that exist below the selected group resource object (210-16 in this example).

The resource management process 120-2 produces and displays the resource information 220 in a shared output display area 217 in the graphical user interface 150 as a result of applying one or more selected tasks 208 to one or more select resource objects 210. In this embodiment, note that the resource information 220-4 produced from application of the selected "Properties" task 208-12 for the Symmetrix data storage system resource 210-10, as well as the resource information 220-5 produced from applying the "Properties" task 208-12 to the selected hosts 210-11 through 210-14, each exist within the same shared output display area 217-5. In other words, a single tile is used in this example to serve as the output display area 217-5 for multiple types of resource information for different types of resources. In addition, note that additional resource information 221 for various other types of selected resources is also available to the user within the shared output display area 217-5. This particular shared output display area 217-5 is titled "Properties" thus indicating the selected resource task (i.e., a properties task) that is/was applied by the resource management process 120-2 (FIG. 1) in order to obtain the resource information 220-4, 220-5, and so forth (i.e., property information concerning each selected resource).

In addition, the user is able to expand the views of the additional resource information 221 by selecting the arrow/triangle to the left of each additional resource information section 221. Doing so causes the graphical user interface 150 to render detailed resource information 220 for each expanded set of resource information 221 within the same shared output display area 217-5.

The graphical user interface 150 illustrated in FIG. 12 also allows a user to select another shared output display area 217 to operate as the current target panel to receive resource information 220 that is output as a result of applying a selected task 208 to a selected set of resource 210. In this example, the shared output display area 217-5 is presently selected as the current target panel (i.e., is the current shared output display areas 217 in use at the moment—shown by its shading). However, notice the resource information 220-6 within the shared output display area 217-7. In this example, this resource information 220-6 was formerly output as a result of the application of a "Relationship" task, as indicated by the "Relationship" title of the shared output display area 217-7. It may be the case, perhaps that the user had previously invoked a relationship task on a set of selected resource objects 210, which in this example appear to be the "Host" objects "losbe060" and "JKURT" 210-14 and 210-13 as indicated within the output resource information 220-6. One reason why the resource information 220-4, 220-5 and 221 (unexpanded resource information) is shown within the shared output display area 217-5 is that the user may have selected the shared output display area 217-5 to be the current or active target panel (i.e., the current output display area) for application of a relationship task, prior to application of the selected properties task 208-12 on the selected resource 210-10 through 210-16. This aspect of embodiments of the invention illustrates how different shared output display areas 217 can contain resource information for different (or the same) resources 210 based on the application of different resource tasks, such as the "Properties" task 208-12 for shared output display area 217-5 and a "Relationships" task for the shared output display area 217-7 in this example.

In this example, the shared output display area 217-6 is also available for user selection. Selecting this area 217-6 which would make the area 217-6 the "current" shared output display area. Doing so would allow the user to select additional (or the same) resource tasks 208 for application to the same or different resource objects 210 in order to produce additional resource information which would be displayed within the target, current or active shared output display area 217-6. In other words, the user is able to designate which shared output display area 217 is to receive the resource information 220 produced as a result of the output of application of a task 208 to one or more selected resources 210. This is not possible in conventional graphical user interfaces used for management of system resources.

In addition to the aforementioned features of the embodiment of the graphical user interface 150 illustrated in FIG. 12, the graphical user interface 150 further includes sub-task menus 226 and 227 related to the sets of resource information 220-4 and 220-5 and to the shared output display areas 217. A user can operate (e.g., pull-down in this example) a sub-task menu 226 and/or 227 to further select additional tasks or sub-functions which the resource management process 120-2 can apply to the resource listed within the resource information 220 (or within the output display area 217) to which that sub-task menu applies. In this example, an "Action" sub-task menus 226 and "Filter" sub-task menus 227 are illustrated, and provide the user with the ability to select action and filter tasks to sets of resource information 220-4 and 220-5. In other words, if a user desires to further filter or limit the amount of resource information 220-5 in the event that the current information 220-5 within a shared output display area 217 is visually overwhelming to that user, the user might decide to operate the Filter sub-task menu 227 to limit the amount of resource information 220-5 based on filtering criteria that the user can select from the Filter sub-task menu 227. As another example, if the user desires to invoke a particular systems management function or operation only upon those resources shown within a particular set of resource information 220, such as the Host resources listed in the set of resource information 220-5, the user might activate a function listed in the "Actions" sub-task menu 226 for that resource information 220. Use of a sub-task menu (e.g., Action menu 226-4) related to a shared output display area causes the action (i.e., the selected task from that menu 226-4, not specifically shown) chosen from that menu to be applied to all sets of resource information 220 within the shared output display area 217.

Use sub-task menus (e.g., 226 and 227 in this particular example), a user is able to micro-manage resources within a computing system environment. As an example of how embodiments of the invention allow a user to micro-manage system resources in this unique manner, suppose a user selects a set of resource objects 210, such as all data storage systems (e.g., via selecting the check box for each data storage system, or via selection of a group of data storage system). The user might then select a high-level systems management operation or resource task to be applied to the selected set of hosts by choosing particular task from a resource task menu 208 to apply to the selected resource objects. Suppose for this example that the user selects a specific performance task from the performance task menu 205-3. This results in the production of resource information 220 within a current target shared output display area 217 (i.e., the current selected target panel) that indicates the performance levels (e.g., amount of free space, current hit/miss ratios, or the like) of the selected data storage systems (i.e., the selections 210) under management of the graphical user interface 150. Then, using a "Filter" sub-task menu 227 related to that resource information 220, the user might specify to filter out and only display those data storage systems, for example, that have a low performance rating, or that have less than 20 Gigabytes of disk space remaining. After selection of such a resource task (i.e., a sub-task), the resource management process 120-2 applies the selected filter sub-task to the resources listed within the current set of resource information 220, resulting in the removal of those data storage system resource that have more than 20 Gigabytes of free space. The user might then decide that he or she wants to physically add more disk space to those remaining data storage systems listed in the "filtered" resource information 220, and might thus use an "Action" sub-task from the action sub-task menu 226 to take those data storage systems "offline" in order to install the additional disks. In this manner, the graphical user interface 150 of embodiments of the invention allows a user to precisely manage system resources using sub-task menus that provide such features as filtering and actions that can be applied in a restricted manner to only those resources listed in the set of resource information 220 for which those menus 226, 227 relate.

Embodiments of the invention thus provide menu choices of filter options or action tasks based upon what resource objects are listed in a particular set of resource information 220 for which that sub-task menu applies. As an example, in FIG. 12, the sub-task menu 226-1 shown for the resource information 220-5 might provide action tasks (i.e., tasks listed in an Action pull-down menu, not specifically shown) that are related to only those listed host computer systems, since the resource information 220-5 relates to hosts, whereas the Action pull-down sub-task menu 226-2 related to the Symmetrix resource information 220-4 provides sub-task choices related to tasks applicable to data storage systems (as opposed to other types of tasks for hosts). Likewise, the choice of filter options within a Filter sub-task menus 227 can be adjusted as well depending upon what resource information 220 is shown in relation to the Filter sub-task menu 227.

The graphical user interface 150 shown in FIG. 12 also includes an alert indicator 224 that can display alerts related to resources 170 under management of the graphical user interface 150. Using this alert information 224, a user can investigate problems related to specific managed resources.

Those skilled in the art will understand that there can be many other variations made to the operations of the embodiments explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. In a computer system having a memory system and a display that displays a graphical user interface for management of system resources, a method comprising the steps of:
  displaying a set of resource tasks in a task display area and concurrently displaying a set of resource objects in a resource display area;
  receiving a selection of at least two resource objects displayed within the resource display area upon which to apply a function associated with at least one resource task displayed in the task display area;

applying the function associated with at least one resource task to resource data associated with each selected resource object to produce resource information for each selected resource object, the function applied to resource data associated with each selected resource object obtained by receiving a selection of at least one resource task, the at least one resource task having an associated function which the step of applying applies to at least one of each selected resource object to produce resource information as a result of the function; and concurrently displaying the resource information for each selected resource object in at least one shared output display area such that a user of the computer system can simultaneously view the resource information for each selected resource object, concurrently displaying the resource information for each selected resource object further comprising concurrently displaying resource information for each respective associated function for the resource objects to which that function is applied in respective shared output display areas, such that a user of the computer system can concurrently compare resource information produced from applying multiple functions associated with multiple resource tasks on multiple resource objects.

2. The method of claim 1 wherein the step of applying the function comprises the steps of:
   determining, for each of the at least one selected resource task, any use cases associated with that task that apply to any selected resource objects; and
   for each use case that applies to a selected resource object, applying an associated function of that use case to resource data associated with the selected resource object to which that use case applies in order to produce the resource information for that selected resource object.

3. The method of claim 2 wherein the resource objects represent entities with a storage area network and wherein the resource tasks represent systems management functions that can be carried out upon the entities with the storage area network.

4. The method of claim 1 wherein:
   the step of receiving a selection of at least one resource task comprises receiving a selection of at least two different resource tasks, each having at least one respective associated function;
   wherein the step of applying applies each respective associated function of each of the at least two selected resource tasks to data associated with at least one of each selected resource object to produce resource information for each respective associated function for the resource objects to which that function is applied.

5. The method of claim 1 wherein the step of displaying a set of resource tasks in a task display area includes the steps of:
   displaying a plurality of task categories, each task category identifying a set of related resource tasks based upon a commonality between functions associated with each resource task in the set;
   receiving a selection of at least one task category from the plurality of task categories; and
   in response to receiving the selection of at least one task category, displaying the set of related resource tasks identified by the selection of at least one task category while hiding from display other sets of resource tasks identified by task categories that are not selected.

6. The method of claim 5 wherein the displayed set of related resource tasks identified by the selection of at least one task category includes at least one resource view task which a user of the computer system may select such that the step of applying the function associated with at least one resource task applies a view function associated with the resource view task to produce resource information in a view format allowing the user to graphically view the resource information.

7. The method of claim 1 wherein:
   the step of concurrently displaying a set of resource objects hierarchically displays the set of resource objects in a resource display area according to a resource object hierarchy that defines hierarchical relationships between certain of the resource objects, such that resource objects hierarchically related below other resource objects are hierarchically displayed below the other resource objects;
   and wherein the step of receiving a selection of at least two resource objects comprises the steps of:
      receiving a selection of a first resource object within the hierarchical display of resource objects; and
      while maintaining the selection of the first resource object, receiving a selection of a second resource object within the hierarchical display of resource objects.

8. The method of claim 1 wherein the resource tasks are displayed on a left portion of the graphical user interface, the resource objects are displayed in a center portion of the graphical user interface, and the shared output display area displays the resource information in at least one view panel with the shared output display area on a right portion of the graphical user interface.

9. The method of claim 1 wherein at least one of the resource display area and the shared output display area include a view panel that includes at least one split panel function and wherein the method further comprises the steps of:
   receiving a selection of a split panel function for a view panel on the graphical user interface; and
   dividing the view panel into at least two view panels in response to receiving the selection of the split panel function.

10. The method of claim 9 wherein the split panel function is at least one of a horizontal split panel function and a vertical split panel function.

11. The method of claim 9 wherein the view panel for which the selection of the split panel function is received is a resource object view panel in the resource display area that contains a display of resource objects for selection by a user, and wherein the step of dividing creates two resource object view panels from which a user of the graphical user interface can select resource objects for application of functions associated with selected resource tasks.

12. The method of claim 9 wherein the view panel for which the selection of the split panel function is received is a view panel in the shared output display area that contains a display of resource information, and wherein the step of dividing creates two view panels from which a user of the graphical user interface can select one view panel to be a target view panel for display of resource information produced as a result of application of functions associated with selected resource tasks on selected resource objects.

13. The method of claim 9 further comprising the steps of:
receiving a selection of a view panel to operate as a target panel in the shared output display area on the graphical user interface;
receiving a modification to a selection of one of:
the at least two resource objects displayed within the resource display area;
the at least one storage resource task displayed within the task display area;
applying the modification to the selection to produce resource information that is displayed within the target panel in the shared output display area.

14. The method of claim 1 wherein the step of concurrently displaying displays the resource information in a form including at least one of: text, a table, a graph, and a network topology map.

15. A method of presenting systems management information relating to resources in a network, the method comprising the steps of:
displaying a plurality of resource tasks in a task display area on a graphical user interface;
displaying a plurality of resource objects in a resource display area on the graphical user interface;
receiving a selection of at least one resource task identifying a function to apply to a selection of at least two resource objects;
receiving a selection of at least one view panel in a shared output display area to be a target panel;
receiving a modification to the selection of the at least one resource task identifying a function to apply to the selection of at least two resource objects;
applying the at least one function associated with each of the at least one resource task to the selection of at least two resource objects to produce a first set of resource information; and
displaying the first set of resource information for each resource object in at least one view panel in the shared output display area for viewing by a user of the graphical user interface.

16. The method of claim 15 further including the steps of:
applying the modification to any selected resource objects to produce a second set of resource information; and
concurrently displaying the second set of resource information in the target panel for viewing by a user of the graphical user interface while concurrently displaying at least portion of the first set of resource information in a view panel that is not the target panel.

17. A computer system, comprising:
a display;
a memory system;
a processor; and
an interconnection mechanism connecting the display, the processor and the memory system;
wherein the memory system is encoded with a resource management application that when performed on the processor, produces a resource management process that includes a graphical user interface produced on the display of the computer system, the graphical user interface allowing the resource management process to perform the operations of:
displaying a set of resource tasks in a task display area and concurrently displaying a set of resource objects in a resource display area in the graphical user interface;
receiving a selection of at least two resource objects displayed within the resource display area upon which to apply a function associated with at least one resource task displayed in the task display area;
receiving a selection of at least two different resource tasks, each having at least one respective associated function which the step of applying applies to at least one of each selected resource object to produce resource information as a result of the function;
applying the function associated with at least one resource task to resource data associated with each selected resource object to produce resource information for each selected resource object, the function applied to resource data associated with each selected resource object obtained by receiving a selection of at least one resource task, the at least one resource task having an associated function which the step of applying applies to at least one of each selected resource object to produce resource information as a result of the function, the resource management process applying each respective associated function of each of the at least two selected resource tasks to data associated with at least one of each selected resource object to produce resource information for each respective associated function for the resource objects to which that function is applied; and
concurrently displaying the resource information for each selected resource object in at least one shared output display area such that a user of the computer system can simultaneously view the resource information for each selected resource object, the resource management process concurrently displaying resource information for each respective associated function for the resource objects to which that function is applied in respective shared output display areas, such that a user of the computer system can concurrently compare resource information produced from applying multiple functions associated with multiple resource tasks on multiple resource objects.

18. The computer system of claim 17 wherein when the resource management process performs the operation of applying the function, the resource management process performs the operations of:
determining, for each of the at least one selected resource task, any use cases associated with that task that apply to any selected resource objects; and
for each use case that applies to a selected resource object, applying an associated function of that use case to resource data associated with the selected resource object to which that use case applies in order to produce the resource information for that selected resource object.

19. The computer system of claim 18 wherein the resource objects represent entities with a storage area network and wherein the resource tasks represent systems management functions that can be carried out upon the entities with the storage area network.

20. The computer system of claim 17 wherein:
when the resource management process performs the operation of receiving a selection of at least one resource task, the resource management process performs the operation of receiving a selection of at least two different resource tasks, each having at least one respective associated function;
wherein when the resource management process performs the operation of applying, the resource management process applies each respective associated function of each of the at least two selected resource tasks to data associated with at least one of each selected resource object to produce resource information for each respective associated function for the resource objects to which that function is applied.

21. The computer system of claim 17 wherein when the resource management process performs the operation of displaying a set of resource tasks in a task display area, the resource management process performs the operations of:
   displaying a plurality of task categories, each task category identifying a set of related resource tasks based upon a commonality between functions associated with each resource task in the set;
   receiving a selection of at least one task category from the plurality of task categories; and
   in response to receiving the selection of at least one task category, displaying the set of related resource tasks identified by the selection of at least one task category while hiding from display other sets of resource tasks identified by task categories that are not selected.

22. The computer system of claim 21 wherein the displayed set of related resource tasks identified by the selection of at least one task category includes at least one resource view task which a user of the computer system may select such that when the resource management process performs the operation of applying the function associated with at least one resource task, the resource management process applies a view function associated with the resource view task to produce resource information in a view format allowing the user to graphically view the resource information in the graphical user interface.

23. The computer system of claim 17 wherein:
   when the resource management process performs the operation of concurrently displaying a set of resource objects, the resource management process hierarchically displays the set of resource objects in a resource display area according to a resource object hierarchy that defines hierarchical relationships between certain of the resource objects, such that resource objects hierarchically related below other resource objects are hierarchically displayed below the other resource objects;
   and wherein when the resource management process performs the operation of receiving a selection of at least two resource objects, the resource management process performs the operations of:
      receiving a selection of a first resource object within the hierarchical display of resource objects; and
      while maintaining the selection of the first resource object, receiving a selection of a second resource object within the hierarchical display of resource objects.

24. The computer system of claim 17 wherein the resource management process displays resource tasks on a left portion of the graphical user interface, and displays the resource objects in a center portion of the graphical user interface, and displays in the shared output display area the resource information in at least one view panel with the shared output display area on a right portion of the graphical user interface.

25. The computer system of claim 17 wherein at least one of the resource display area and the shared output display area include a view panel that includes at least one split panel function and wherein the resource management process further performs the operations of:
   receiving a selection of a split panel function for a view panel on the graphical user interface; and
   dividing the view panel into at least two view panels in response to receiving the selection of the split panel function.

26. The computer system of claim 25 wherein the split panel function is at least one of a horizontal split panel function and a vertical split panel function.

27. The computer system of claim 26 wherein the view panel for which the selection of the split panel function is received is a resource object view panel in the resource display area that contains a display of resource objects for selection by a user, and wherein when the resource management process performs the operation of dividing, the resource management process creates two resource object view panels from which a user of the graphical user interface can select resource objects for application of functions associated with selected resource tasks.

28. The computer system of claim 26 wherein:
   the view panel for which the selection of the split panel function is received is a view panel in the shared output display area that contains a display of resource information; and
   wherein when the resource management process performs the operation of dividing, the resource management process creates two view panels from which a user of the graphical user interface can select one view panel to be a target view panel for display of resource information produced as a result of application of functions associated with selected resource tasks on selected resource objects.

29. The computer system of claim 26 wherein the resource management process further performs the operations of:
   receiving a selection of a view panel to operate as a target panel in the shared output display area on the graphical user interface;
   receiving a modification to a selection of one of:
      the at least two resource objects displayed within the resource display area;
      the at least one storage resource task displayed within the task display area;
   applying the modification to the selection to produce resource information that is displayed within the target panel in the shared output display area.

30. The computer system of claim 17 wherein when the resource management process performs the operation of concurrently displaying, the resource management process displays the resource information in a form including at least one of: text, a table, a graph, and a network topology map.

31. A computer system for presenting systems management information relating to resources in a network, the computer system comprising:
   a display;
   a memory system;
   a processor; and
   an interconnection mechanism connecting the display, the processor and the memory system;
   wherein the memory system is encoded with a resource management application that when performed on the processor, produces a resource management process that includes a graphical user interface produced on the display of the computer system, the graphical user interface allowing the resource management process to perform the operations of:
   displaying a plurality of resource tasks in a task display area on the graphical user interface on the display;
   displaying a plurality of resource objects in a resource display area on the graphical user interface on the display;

receiving a selection of at least one resource task identifying a function to apply to a selection of at least two resource objects;

receiving a selection of at least one view panel in a shared output display area to be a target panel;

receiving a modification to the selection of the at least one resource task identifying a function to apply to the selection of at least two resource objects;

in the memory system, applying the at least one function associated with each of the at least one resource task to the selection of at least two resource objects in the memory system to produce a first set of resource information in the memory system; and displaying the first set of resource information for each resource object in at least one view panel in the shared output display area for viewing by a user of the graphical user interface.

32. The computer system of claim 31 wherein the resource management process further performs the operations of:

applying the modification to any selected resource objects to produce a second set of resource information; and concurrently displaying the second set of resource information in the target panel for viewing by a user of the graphical user interface while concurrently displaying at least portion of the first set of resource information in a view panel that is not the target panel.

33. A computer program product having a computer-readable medium including computer program logic encoded thereon that, when executed on a computer system having a coupling of a memory system, a processor, and a display that displays a graphical user interface, and wherein when the computer program logic is executed on the processor, the computer program logic provides a method for management of network resources by causing the processor to perform the operations of:

displaying a set of resource tasks in a task display area and concurrently displaying a set of resource objects in a resource display area;

receiving a selection of at least two resource objects displayed within the resource display area upon which to apply a function associated with at least one resource task displayed in the task display area;

applying the function associated with at least one resource task to resource data associated with each selected resource object to produce resource information for each selected resource object, the function applied to resource data associated with each selected resource object obtained by receiving a selection of at least one resource task, the at least one resource task having an associated function which the step of applying applies to at least one of each selected resource object to produce resource information as a result of the function; and concurrently displaying the resource information for each selected resource object in at least one shared output display area such that a user of the computer system can simultaneously view the resource information for each selected resource object, concurrently displaying the resource information for each selected resource object further comprising concurrently displaying resource information for each respective associated function for the resource objects to which that function is applied in respective shared output display areas, such that a user of the computer system can concurrently compare resource information produced from applying multiple functions associated with multiple resource tasks on multiple resource objects.

34. A computer program product having a computer-readable medium including computer program logic encoded thereon that, when executed on a computer system having a coupling of a memory system, a processor, and a display that displays a graphical user interface, and wherein when the computer program logic is executed on the processor, the computer program logic provides a method for management of network resources by causing the processor to perform the operations of:

displaying a plurality of resource tasks in a task display area on a graphical user interface;

displaying a plurality of resource objects in a resource display area on the graphical user interface;

receiving a selection of at least one resource task identifying a function to apply to a selection of at least two resource objects;

receiving a selection of at least one view panel in a shared output display area to be a target panel:

receiving a modification to the selection of the at least one resource task identifying a function to apply to the selection of at least two resource objects;

applying the at least one function associated with each of the at least one resource task to the selection of at least two resource objects to produce a first set of resource information; and displaying the first set of resource information for each resource object in at least one view panel in the shared output display area for viewing by a user of the graphical user interface.

35. The computer program product of claim 34 wherein the computer program logic further includes instructions that, when performed on the processor, cause the processor to perform the operations of:

applying the modification to any selected resource objects to produce a second set of resource information; and concurrently displaying the second set of resource information in the target panel for viewing by a user of the graphical user interface while concurrently displaying at least portion of the first set of resource information in a view panel that is not the target panel.

36. A computer system, comprising:

a display;

a memory system;

a processor; and an interconnection mechanism connecting the display, the processor and the memory system;

wherein the memory system is encoded with a resource management application that when performed on the processor, produces a resource management process that includes a graphical user interface produced on the display of the computer system and provides a means for management of network resource by providing the computer system with:

means for displaying a set of resource tasks in a task display area and concurrently displaying a set of resource objects in a resource display area in the graphical user interface;

means for receiving a selection of at least two resource objects displayed within the resource display area upon which to apply a function associated with at least one resource task displayed in the task display area;

means for receiving a selection of at least two different resource tasks, each having at least one respective associated function which the step of applying applies to at least one of each selected resource object to produce resource information as a result of the function;

means for applying the function associated with at least one resource task to resource data associated with each selected resource object to produce resource information for each selected resource object, the function applied to resource data associated with each selected resource object obtained by receiving a selection of at least one resource task, the at least one resource task having an associated function which the step of applying applies to at least one of each selected resource object to produce resource information as a result of the function, the means for applying further applying each respective associated function of each of the at least two selected resource tasks to data associated with at least one of each selected resource object to produce resource information for each respective associated function for the resource objects to which that function is applied; and means for concurrently displaying the resource information for each selected resource object in at least one shared output display area such that a user of the computer system can simultaneously view the resource information for each selected resource object, further comprising concurrently displaying resource information for each respective associated function for the resource objects to which that function is applied in respective shared output display areas, such that a user of the computer system can concurrently compare resource information produced from applying multiple functions associated with multiple resource tasks on multiple resource objects.

37. A computer system, comprising:
a display;
a memory system;
a processor; and
an interconnection mechanism connecting the display, the processor and the memory system;
wherein the memory system is encoded with a resource management application that when performed on the processor, produces a resource management process that includes a graphical user interface produced on the display of the computer system and provides a means for management of network resource by providing the computer system with:

displaying a plurality of resource tasks in a task display area on a graphical user interface;

displaying a plurality of resource objects in a resource display area on the graphical user interface;

receiving a selection of at least one view panel in a shared output display area to be a target panel;

receiving a modification to the selection of the at least one resource task identifying a function to apply to the selection of at least two resource objects;

receiving a selection of at least one resource task identifying a function to apply to a selection of at least two resource objects;

applying the at least one function associated with each of the at least one resource task to the selection of at least two resource objects to produce a first set of resource information; and displaying the first set of resource information for each resource object in at least one view panel in the shared output display area for viewing by a user of the graphical user interface.

* * * * *